(12) United States Patent
Satou et al.

(10) Patent No.: US 7,766,096 B2
(45) Date of Patent: Aug. 3, 2010

(54) ELECTRICAL POWER TOOL

(75) Inventors: Shinichirou Satou, Hitachinaka (JP); Tsukasa Suzuura, Hitachinaka (JP); Shinki Ohtsu, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 148 days.

(21) Appl. No.: 12/281,787

(22) PCT Filed: Feb. 27, 2007

(86) PCT No.: PCT/JP2007/054135
§ 371 (c)(1), (2), (4) Date: Sep. 5, 2008

(87) PCT Pub. No.: WO2007/102449
PCT Pub. Date: Sep. 13, 2007

(65) Prior Publication Data
US 2009/0095499 A1    Apr. 16, 2009

(30) Foreign Application Priority Data
Mar. 7, 2006  (JP)  ............................ 2006-060932
Jun. 16, 2006 (JP)  ............................ 2006-166949

(51) Int. Cl.
*B25D 11/00* (2006.01)
(52) U.S. Cl. ................ 173/162.2; 173/48; 173/109; 173/201; 173/211
(58) Field of Classification Search ............. 173/48, 173/104, 109, 201, 210, 211, 2, 162.2, 162.1
See application file for complete search history.

(56) References Cited
U.S. PATENT DOCUMENTS

| | | | |
|---|---|---|---|
| 1,845,825 A * | 2/1932 | Benedict .................. | 173/162.2 |
| 2,896,447 A | 7/1959 | Phillips et al. | |
| 4,282,938 A * | 8/1981 | Minamidate ............. | 173/162.2 |
| 4,478,293 A * | 10/1984 | Weilenmann et al. .... | 173/162.2 |
| 6,076,616 A * | 6/2000 | Kramp et al. ............ | 173/162.2 |
| 6,112,831 A * | 9/2000 | Gustafsson .............. | 173/162.2 |
| 6,907,943 B2 * | 6/2005 | Ikuta .......................... | 173/117 |

(Continued)

FOREIGN PATENT DOCUMENTS

DE    10 2004 001 A1    8/2005

(Continued)

*Primary Examiner*—Scott A. Smith
(74) *Attorney, Agent, or Firm*—Antonelli, Terry, Stout & Kraus, LLP.

(57) ABSTRACT

An electrical power tool (1) includes a housing (10,20,30), an electrical motor (21), a motion conversion mechanism (36), a counterweight holding member (73), a counterweight (74), and support members (71,72). The electrical motor (21) is accommodated in the housing (10,20,30). The motion conversion mechanism (36) is configured to convert a rotary motion of the electrical motor (21) into a reciprocation motion. The counterweight holding member (73) extends in a direction perpendicular to directions of the reciprocation motion and is capable of being elastically deformed in the directions of the reciprocation motion. The counterweight (74) is supported by the counterweight holding member (73) and is capable of reciprocating in the directions of reciprocation motion together with the counterweight holding member (73). The support members (71,72) are positioned away from the counterweight (74) by a predetermined distance for supporting the counterweight holding member (73) to the housing (10,20,30). The counterweight (74) is interposed between or among the support members (71,72).

19 Claims, 18 Drawing Sheets

U.S. PATENT DOCUMENTS

| | | | |
|---|---|---|---|
| 6,962,211 B2 * | 11/2005 | Daubner et al. | 173/162.2 |
| 7,076,838 B2 * | 7/2006 | Meixner | 16/431 |
| 7,252,157 B2 * | 8/2007 | Aoki | 173/162.2 |
| 7,320,369 B2 * | 1/2008 | Stirm et al. | 173/162.2 |
| 7,451,833 B2 * | 11/2008 | Hahn | 173/104 |
| 7,513,317 B2 * | 4/2009 | Satou | 173/162.2 |

FOREIGN PATENT DOCUMENTS

| | | |
|---|---|---|
| EP | 1 252 976 A1 | 10/2002 |
| EP | 1 422 029 A1 | 5/2004 |
| EP | 1 464 449 A2 | 10/2004 |
| EP | 1 464 449 A3 | 3/2007 |
| GB | 2 265 669 A | 10/1993 |
| JP | 61-178188 | 8/1986 |
| JP | 1-214401 | 8/1989 |
| JP | 1-274972 | 11/1989 |
| WO | WO 02/083369 A1 | 10/2002 |

* cited by examiner

ELECTRICAL POWER TOOL

TECHNICAL FIELD

The present invention relates to an electrical power tool and more specifically, to an electrical power tool having a vibration control mechanism.

BACKGROUND ART

Conventionally, electrical power tools having vibration control mechanisms have been proposed. For example, Japanese Patent Application Publication No. 2004-299036 discloses an electrical power tool including a casing that has a handle, a motor housing, and a gear housing connected with one another. An electrical motor is accommodated in the motor housing. The gear housing has a motion conversion housing, a vibration control housing, and an impact housing. A motion conversion mechanism that converts a rotation motion of the electrical motor into a reciprocation motion is provided in the motion conversion housing. A cylinder extending a direction perpendicular to the rotation axis of the electrical motor is provided in the impact housing. A tool support portion is provided on the front side of the cylinder and is capable of attaching or detaching a working tool.

A piston is provided in the cylinder and is slidably provided along the inner periphery of the cylinder. The piston reciprocates along the inner periphery of the cylinder by the motion conversion mechanism. A striking member is provided in the front section of the cylinder and is slidably provided along the inner periphery of the cylinder. An air chamber is formed in the cylinder between the piston and the striking member. An intermediate member is provided in the front side of the striking member and is slidably provided back-and-forth within the cylinder. The working tool mentioned above is positioned at the front side of the intermediate element.

The vibration control housing is provided on the side of the impact housing and communicates with the impact housing by way of an air channel. A space formed by the piston, the cylinder, the impact housing, the counterweight, and the vibration control housing is formed as a sealed space. A counterweight and two springs are provided in the vibration control housing. The counterweight is capable of moving a reciprocation motion parallel to the reciprocation motion of the piston. The two springs are positioned at the ends of the counterweight.

The rotational driving force of the electrical motor is transmitted to the motion conversion mechanism, and the motion conversion mechanism moves the piston in the cylinder in the reciprocation motion. The reciprocation motion of the piston repeatedly increases and decreases the pressure of the air in the air chamber, thereby applying an impact force to the striking member. The striking member moves forward and collides with the rear end of the intermediate member, thereby applying the impact force to the working tool. The workpiece is fractured by the impact force applied to the working tool.

During the operation of the electrical power tool, when the piston moves forward, the counterweight moves rearward because the space formed by the piston, the cylinder, the impact housing, the counterweight, and the vibration control housing is a sealed space. Conversely, when the piston moves rearward, the counterweight moves forward. Thus, in this structure, the counterweight reciprocates in conjunction with the reciprocation motion of the piston.

However, in the electrical power tool described above, when the counterweight-vibrates, the friction between the two springs and the vibration control housing prevents the counterweight from vibrating efficiently. Thus, the vibration caused by the striking member cannot be reduced efficiently. The vibration control housing is provided on the side of the impact housing, the electrical power tool, thereby leading to as increased size in the electrical power tool.

DISCLOSURE OF INVENTION

In view of the foregoing, it is an object of the present invention to provide an electrical power tool that is capable of efficiently reducing the vibration resulting from the striking member and that does not lead to an increased size even with the use of a counterweight mechanism.

This and other object of the present invention will be attained by an electrical power tool including a housing, an electrical motor, a motion conversion mechanism, a counterweight holding member, and a counterweight. The electrical motor is accommodated in the housing. The motion conversion mechanism is configured to convert a rotary motion of the electrical motor into a reciprocation motion. The counterweight holding member extends in a direction perpendicular to directions of the reciprocation motion and is capable of being elastically deformed in the directions of the reciprocation motion. The counterweight is supported by the counterweight holding member and is capable of reciprocating in the directions of reciprocation motion together with the counterweight holding member. The support members are positioned away from the counterweight by a predetermined distance for supporting the counterweight holding member to the housing. The counterweight is interposed between or among the support members.

With this arrangement, the counterweight holding member and the counterweight can be vibrated smoothly in the same directions as the directions of the reciprocation motion. Accordingly, a vibration generated by the reciprocation motion of the motion conversion mechanism can be reduced by a vibration of the counterweight 74, thereby improving the operation of the electrical power tool.

Preferably, the support members include two support members positioned opposing each other. With this arrangement, the counterweight holding member and the counterweight can be vibrated smoothly in the same directions as the directions of the reciprocation motion. The vibration generated by the reciprocation motion of the motion conversion mechanism can be reduced by the vibration of the counterweight, thereby improving the operation of the electrical power tool.

Preferably, the counterweight holding member has end portions corresponding to the support members. At least one of the end portions is movably supported with respect to the support members. With this arrangement, the counterweight holding member and the counterweight can be vibrated smoothly in the same directions as the directions of the reciprocation motion.

Preferably, the counterweight and the counterweight holding member are configured to vibrate to reduce a vibration generated by the reciprocation motion of the motion conversion mechanism. At least one of the support members is configured to restrict a vibration of the counterweight and the counterweight holding member.

With this arrangement, the vibration of the counterweight holding member and the counterweight can be controlled and the resonance frequency of the counterweight mechanism (the counterweight holding member, the counterweight, and support members) can be adjusted.

Preferably, the counterweight holding member has end portions corresponding to the support members. At least one of the end portions of the counterweight holding member has a slip prevention section for preventing the counterweight holding member from slipping out from the support members. With this arrangement, the counterweight holding member can be prevented from slipping out from the support members.

Preferably, the support members, the counterweight holding member, and the counterweight are interposed between the motor and the motion conversion mechanism.

With this arrangement, the counterweight holding member and the counterweight can be vibrated smoothly in the same directions as the directions of the reciprocation motion. The vibration generated by the reciprocation motion of the motion conversion mechanism can be reduced by the vibration of the counterweight, thereby improving the operation of the electrical power tool.

Preferably, the counterweight includes a base and two legs. The base extends in a direction perpendicular to the direction in which the counterweight holding member extends. The base is fixed to the counterweight holding member, and has ends. Each of two legs is connected to each of the ends of the base respectively and extends along and is separated from the counterweight holding member.

With this arrangement, the length of the counterweight holding member needed to obtain a desired resonance frequency can be reduced, thereby providing a compact overall size of the counterweight mechanism.

Preferably, the motion conversion mechanism includes, a cylinder, a piston, a motion conversion section, and striking member. The cylinder has an inner periphery. The a piston is slidably provided on the inner periphery of the cylinder. The motion conversion section is configured to convert the rotation of the electrical motor into a reciprocation motion of the piston. The striking member is driven by the reciprocation motion of the piston.

With this arrangement, an impact force can be applied to a working tool by providing the working tool to the head of the electrical power tool. Also, the counterweight mechanism is most effective against vibrations generated by the reciprocation motion of a component, such as the striking member, having a certain amount of mass.

Preferably, the supporting member is configured to change a state that the supporting member supports the counterweight holding member when the counterweight moves from an initial position thereof toward at least one direction of the reciprocation motion.

With this arrangement, the vibration of the electrical power tool due to impact can be efficiently reduced and the operation of the electrical power tool can be improved. Since the counterweight mechanism has a simple structure, a large number of parts such as expensive cylinders are not needed. The vibration of the electrical power tool can be reduced without leading to a increased size, higher expenses, reduced visibility, and the like in the electrical power tool.

Preferably, each of the support members includes a first support member and a second support member. The first support member is configured to block the counterweight holding member from moving toward the one direction. The second support member is positioned closer to the counterweight than the first support member to the counterweight and is configured to block the counterweight holding member in another direction opposite to the one direction. The first support member and the second support member are positioned to apply an initial force in the one direction to the counterweight holding member.

With this arrangement, a spring constant of the counterweight holding member in a moving direction of the counterweight can be decreased depending on increase of the displacement of the counterweight when the counterweight is moved from its initial position toward at least one direction of the reciprocation motion. Accordingly, the electrical power tool with low vibration, a compact size, and low cost can be provided.

Preferably, the counterweight holding member includes a bent section. The counterweight holding member is supported by the first support member and the second support member at the bent section. With this arrangement, when the counterweight holding member is supported by the first support members and the second support members, the counterweight holding member is prevented from separating from each of the support members. Accordingly, the unexpected initial deformations during the production process of the counterweight holding member can be corrected.

Preferably, the counterweight holding member is movably supported with respect to the first support member. With this arrangement, the counterweight holding member and the counterweight can be vibrated smoothly in the same directions as the directions of the reciprocation motion.

Preferably, the first support member is configured to restrict a vibration of the counterweight and the counterweight holding member. With this arrangement, the vibration of the counterweight holding member and the counterweight can be controlled and characteristic vibration frequency and damping of the counterweight mechanism can be adjusted arbitrarily. Accordingly, a vibration control mechanism (the counterweight mechanism) suited for various types of electrical power tools can be provided.

Preferably, one first support member of one support member movably supports the counterweight and another first support member of another support member is configured to restrict a vibration of the counterweight and the counterweight holding member. With this arrangement, the counterweight holding member and the counterweight can be vibrated smoothly in the same directions as the directions of the reciprocation motion. The vibration of the counterweight holding member and the counterweight can be controlled and characteristic vibration frequency and damping of the counterweight mechanism can be adjusted arbitrarily. Accordingly, a vibration control mechanism (the counterweight mechanism) suited for various types of electrical power tools can be provided.

Preferably, the counterweight holding member has a slip prevention section for preventing the counterweight holding member from slipping out from the first support member. With this arrangement, the counterweight holding member can be prevented from slipping out from the first support members.

Preferably, the support members, the counterweight holding member, and the counterweight are interposed between the motor and the motion conversion mechanism. With this arrangement, the counterweight holding member and the counterweight can be vibrated smoothly in the same directions as the directions of the reciprocation motion. The vibration of the electrical power tool can be reduced by the vibration of the counterweight, thereby improving the operation of the electrical power tool.

Preferably, the counterweight holding member has a part positioned between the first support members. The counterweight has a center of gravity positioned at a center of the part. With this arrangement, the counterweight holding member and the counterweight can be vibrated smoothly in the same directions as the directions of the reciprocation motion without swinging the counterweight.

Preferably, the counterweight comprises a base and two legs. The base extends in a direction perpendicular to the direction in which the counterweight holding member extends. The base is fixed to the counterweight holding member, and having ends. Each of two legs is connected to each of the ends of the base respectively and extending along and being separated from the counterweight holding member.

With this arrangement, the length of the counterweight holding member needed to obtain a desired resonance frequency can be reduced, thereby providing a compact overall size of the counterweight mechanism.

Preferably, the motion conversion mechanism includes a cylinder, a piston, a motion conversion section, and a striking member. The cylinder has an inner periphery. The piston is slidably provided on the inner periphery of the cylinder. The motion conversion section is configured to convert the rotation of the electrical motor into a reciprocation motion of the piston. The striking member is driven by the reciprocation motion of the piston.

With this arrangement, an impact force can be applied to a working tool by providing the working tool to the head of the electrical power tool. Also, the counterweight mechanism is most effective against vibrations generated by the reciprocation motion of a component, such as the striking member, having a certain amount of mass.

BEST MODE FOR CARRYING OUT THE INVENTION

Figure 1:
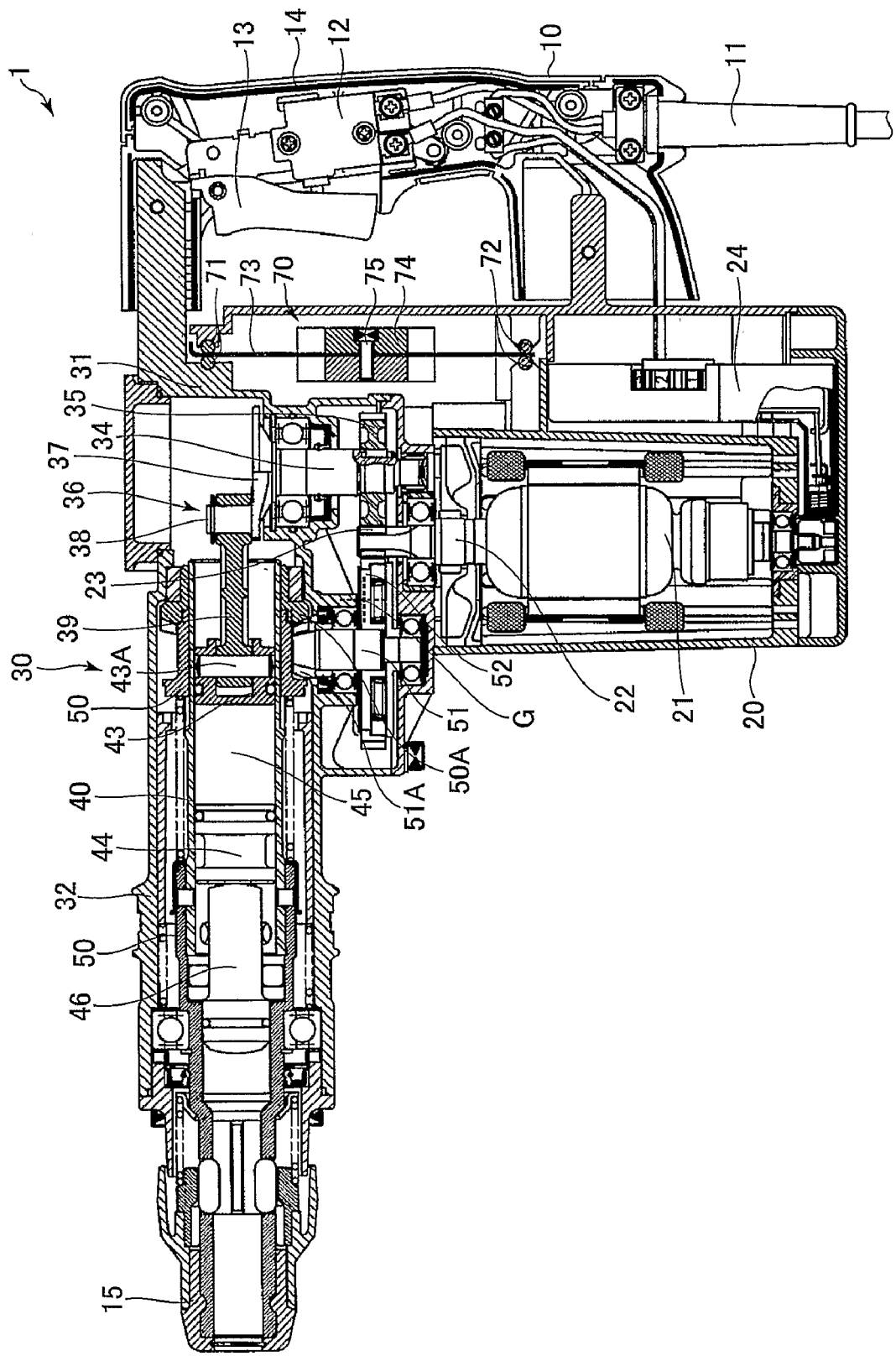
FIG. 1 is a cross-sectional view showing an impact tool according to a first embodiment of the present invention.
Figure 2:
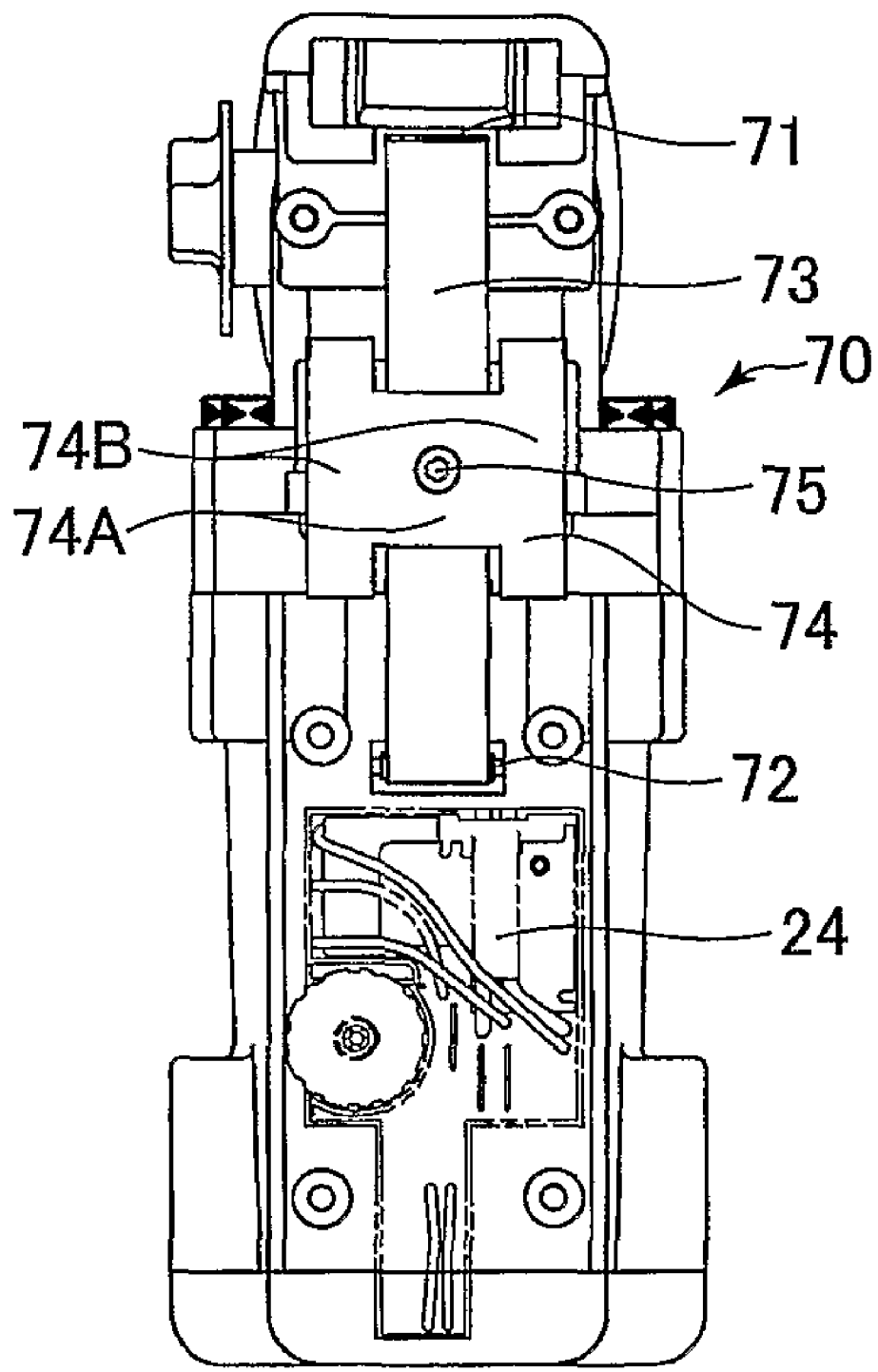
FIG. 2 is a rear-view of a counterweight mechanism of the impact tool according to the first embodiment of the present invention.

An electrical power tool according to a first embodiment of the present invention will be described while referring to FIGS. 1 and 2. The electrical power tool of the first embodiment is applied to an impact tool 1. In FIG. 1, the left side will be described as the front side of the impact tool 1 and the right side will be described as the back side of the impact tool 1. The impact tool 1 includes a casing having a handle 10, a motor housing 20, and a gear housing 30 connected with one another.

A power cable 11 is attached to the handle 10. The handle 10 houses a switch mechanism 12. A trigger 13 that can be manipulated by the user is mechanically connected to the switch mechanism 12. The switch mechanism 12 is connected to an external power source (not shown) through the power cable 11. By operating the trigger 13, an electrical motor 21 described later can be connected to and disconnected from the external power source. Also, the handle 10 includes a grip 14 that is gripped by the user when the impact tool 1 is used.

The motor housing 20 is positioned at a lower front side of the handle 10. The electrical motor 21 is accommodated in the motor housing 20. The electrical motor 21 includes an output shaft 22 that outputs a driving force of the electrical motor. A pinion gear 23 is provided on the end of the output shaft 22 and is positioned in the gear housing 30. A control unit 24 for controlling a rotation speed of the electrical motor 21 is located on the motor housing 20 behind the electrical motor 21.

The gear housing 30 includes a motion conversion housing 31 and a hammer housing 32. The motion conversion housing 31 is positioned above the motor housing 20 and a rear end of the motion conversion housing 31 is connected to the handle 10. The hammer housing 32 is positioned above the motor housing 20.

A crank shaft 34 that extends parallel to the output shaft 22 is rotatably supported on the rear side of the pinion gear 23 in the motion conversion housing 31. A first gear 35 that meshingly engaged with the pinion gear 23 is coaxially fixed to the lower end of the crank shaft 34. A motion conversion mechanism 36 is provided at the upper side of the crank shaft 34. The motion conversion mechanism 36 includes a crank weight 37, a crank pin 38, and a connecting rod 39. The crank weight 37 is fixed to the upper end of the crank shaft 34. The crank pin 38 is fixed to the end portion of the crank weight 37. The crank pin 38 is inserted into the rear end of the connecting rod 39.

A rotation transmission shaft 51 extending parallel to the output shaft 22 is rotatably supported on the front side of the pinion gear 23 in the motion conversion housing 31. A second gear 52 that meshingly engaged with the pinion gear 23 is coaxially fixed to the lower end of a rotation transmission shaft 51. A first bevel gear 51A is coaxially fixed to the upper end of the rotation transmission shaft 51.

A cylinder 40 extending in a direction perpendicular to the output shaft 22 is provided in the hammer housing 32. The center axis of the cylinder 40 and the rotation axis of the output shaft 22 are positioned on a same plane. The rear end of the cylinder 40 opposes the electrical motor 21 in the axial direction of the output shaft 22. A piston 43 is provided in the cylinder 40 and is slidably provided along the inner periphery of the cylinder 40. The piston 43 reciprocates in the axial direction of the cylinder 40. The piston 43 includes a piston pin 43A that inserted into the front end of the connecting rod 39. A striking member 44 is provided in the front section of the cylinder 40 and is slidably provided along the inner periphery of the cylinder 40 in the axial direction thereof. An air chamber 45 is formed among the cylinder 40, the piston 43, and the hammer 44.

A rotating cylinder 50 is rotatably supported in the hammer housing 32. The rotating cylinder 50 surrounds the front section of the outer perimeter of the cylinder 40. The rotating cylinder 50 extends forward of the cylinder 40, and a tool support portion 15 is provided at the end of the rotating cylinder 50 and is capable of attaching or detaching a working tool (not shown). A second bevel gear 50A that meshingly engaged with the first bevel gear 51A is provided on the rear end portion of the rotating cylinder 50. The center axis of the rotating cylinder 50 and the rotation axis of the output shaft 22 are positioned on a same plane. Also, an intermediate member 46 is provided in the front side of the striking member 44 and is slidably provided against the rotating cylinder 50. The intermediate member 46 reciprocates in the axial direction of the rotating cylinder 50.

A counterweight mechanism 70 is provided in the motion conversion housing 31 and in opposition to the handle 10. The counterweight mechanism 70 is positioned between a center of gravity G of the impact tool 1 and the grip 14 of the handle 10 and is positioned above the control unit 24. The counterweight mechanism 70 will be described while referring to FIGS. 1 and 2. The counterweight mechanism 70 includes a pair of support members 71, a pair of support members 72, a counterweight holding member 73, and a counterweight 74. The support members 71 and 72 are positioned on a plane perpendicular to the reciprocating direction of the piston 43. The support members 71 oppose the support members 72 on the plane. The pair of support members 71 is made from rubber and is fixed to the upper section of the motion conversion housing 31. The pair of support members 72 is made from steel roller and is fixed to the motion conversion housing 31.

The counterweight holding member 73 is made from a leaf spring. The upper end portion of the counterweight holding member 73 has an L-shaped, is positioned between the pair of support members 71 and is supported by the support members 71 with line contacts. Since the pair of support members 71 is made from rubber, the upper end portion of the counterweight holding member 73 is supported by the support members 71 while being capable of moving up and down with respect to the support members 71. The lower end portion of the counterweight holding member 73 is positioned between the pair of support members 72 and is supported by the support members 72 with line contacts. Since the pair of support members 72 is made from the steel roller, the lower end portion of the counterweight holding member 73 is supported by the support members 72 while being capable of moving up and down with respect to the support members 72. The counterweight 74 is fixed roughly in the vertical center of the counterweight holding member 73 using a bolt 75. The counterweight 74 is doubly supported at its both ends by the counterweight holding member 73. As shown in FIG. 2, the counterweight 74 includes a base 74A and two legs 74B. The base 74A extends in a direction perpendicular to the extending direction of the counterweight holding member 73 and is fixed to the counterweight holding member 73. Each of the two legs 74B is connected to the ends of the base 74A and extends along and is separated from the counterweight holding member 73. Hence, the counterweight 74 has an H-shaped.

Next, the operation of the impact tool 1 according to the first embodiment will be described. The working tool (not shown) is pressed against a workpiece (not shown) with the handle 10 gripped by the user. Next, the trigger 12 is pulled to supply power to and rotate the electrical motor 21. This rotation driving force is transmitted to the crank shaft 34 by way of the pinion gear 23 and the first gear 35. The rotation of the crank shaft 34 is converted into reciprocation motion of the piston 43 in the cylinder 40 by the motion converter mechanism 36 (the crank weight 37, the crank pin 38, and the connecting rod 39). The reciprocation motion of the piston 43 leads to repeated increments and decrements the pressure of the air in the air chamber 45, thereby causing a reciprocation motion of the striking member 44. The striking member 44 moves forward and collides with the rear end of the intermediate member 46, thereby applying an impact force to the working tool (not shown).

Also, the rotation driving force of the electrical motor 21 is transmitted to the pinion gear 23, the second gear 52, and the rotation transmission shaft 51. The rotation of the rotation transmission shaft 51 is transmitted to the rotating cylinder 50 by way of the first bevel gear 51A and the second bevel gear 50A, resulting in rotation of the rotating cylinder 50. The rotation of the rotating cylinder 50 applies a rotation force to the working tool (not shown). The workpiece (not shown) is fractured by the rotation force and the impact force described above applied to the working tool (not shown).

During the operation of the impact tool 1 described above, a vibration with a roughly constant frequency resulting from the reciprocation motion of the striking member 44 is generated in the impact tool 1. The vibration is transmitted to the support members 71 and 72 by way of the motion conversion housing 31. The vibration transmitted to the support members 71 and 72 is transmitted to the counterweight holding member 73 and the counterweight 74, leading to the counterweight 74 vibrating in a direction that the piston 43 reciprocates. The vibration of the impact tool 1 can be reduced by the vibration of the counterweight 74, thereby improving the operation of the impact tool 1.

More specifically, the vibration of a frequency band having a constant width centering on a resonance frequency is reduced by the vibration of the counterweight 74. The resonance frequency is determined by the counterweight 74 and the counterweight holding member 73 which is a leaf spring. The resonance frequency is set up to be roughly identical to the frequency of the vibration generated by the impact of the impact tool 1. A resonance frequency (resonance point) f is $f=1/(2\pi)((k_1+k_2)/m)^{1/2}$, where the spring constants of the counterweight holding member 73 made from the leaf spring are $k_1$ (the spring constant of the counterweight holding member 73 positioned higher than the counterweight 74), $k_2$ (the spring constant of the counterweight holding member 73 positioned lower than the counterweight 74), and the mass of the counterweight 74 is m. Practically, the actual resonance frequency band will be slightly wider and slightly lower than the theoretical resonance frequency band due to the influence of damping and the like. Thus, the resonance point determined from the above equation is set to be slightly higher than the vibration frequency of the impact tool 1.

Since the counterweight 74 is doubly supported on both ends by the counterweight holding member 73 as described above, rotation moment that would be generated with a cantilevered counterweight can be prevented. Also, the ends of the counterweight holding member 73 are movably supported with respect to the support members 71 and 72. Hence, no friction is generated between the motion conversion housing 31 and the counterweight 74 and the counterweight holding member 73 made from the leaf spring. Accordingly, the counterweight holding member 73 and the counterweight 74 can be vibrated smoothly in the same directions as the directions for the reciprocation motion of the piston 43. Thus, the vibration of the impact tool 1 caused by the reciprocation motion of the striking member 44 can be efficiently reduced, thereby improving the operation of the impact tool 1. Also, since the upper end of the counterweight holding member 73 is the L-shaped, the counterweight holding member 73 can be prevented from slipping out from the support members 71. Furthermore, the counterweight 74 is the H-shaped. As a result, the length of the counterweight holding member 73 needed to obtain a desired resonance frequency can be reduced, thereby providing a compact overall size for the counterweight mechanism 70.

Since the counterweight mechanism 70 is positioned above the control unit 24 and is disposed in opposition to the handle 10, the open space above the control unit 24 can be used effectively and enlargement of the impact tool 1 by providing the counterweight mechanism 70 can be prevented. The counterweight mechanism 70 is positioned between the grip 14 and the center of gravity G of the impact tool 1. Therefore, the rotation moment centering on the center of gravity G caused by the reciprocation motion of the piston 43 can be reduced. Also, since springs supporting the counterweight 74 are not placed at ends of the counterweight 74 in the directions of the reciprocation motion of the piston 43, as in conventional impact tools, frication between the housing, and the springs and the counterweight 74 can be prevented. Thus, the vibration of the counterweight 74 can be stabilized and efficiently absorbed.

Figure 3:
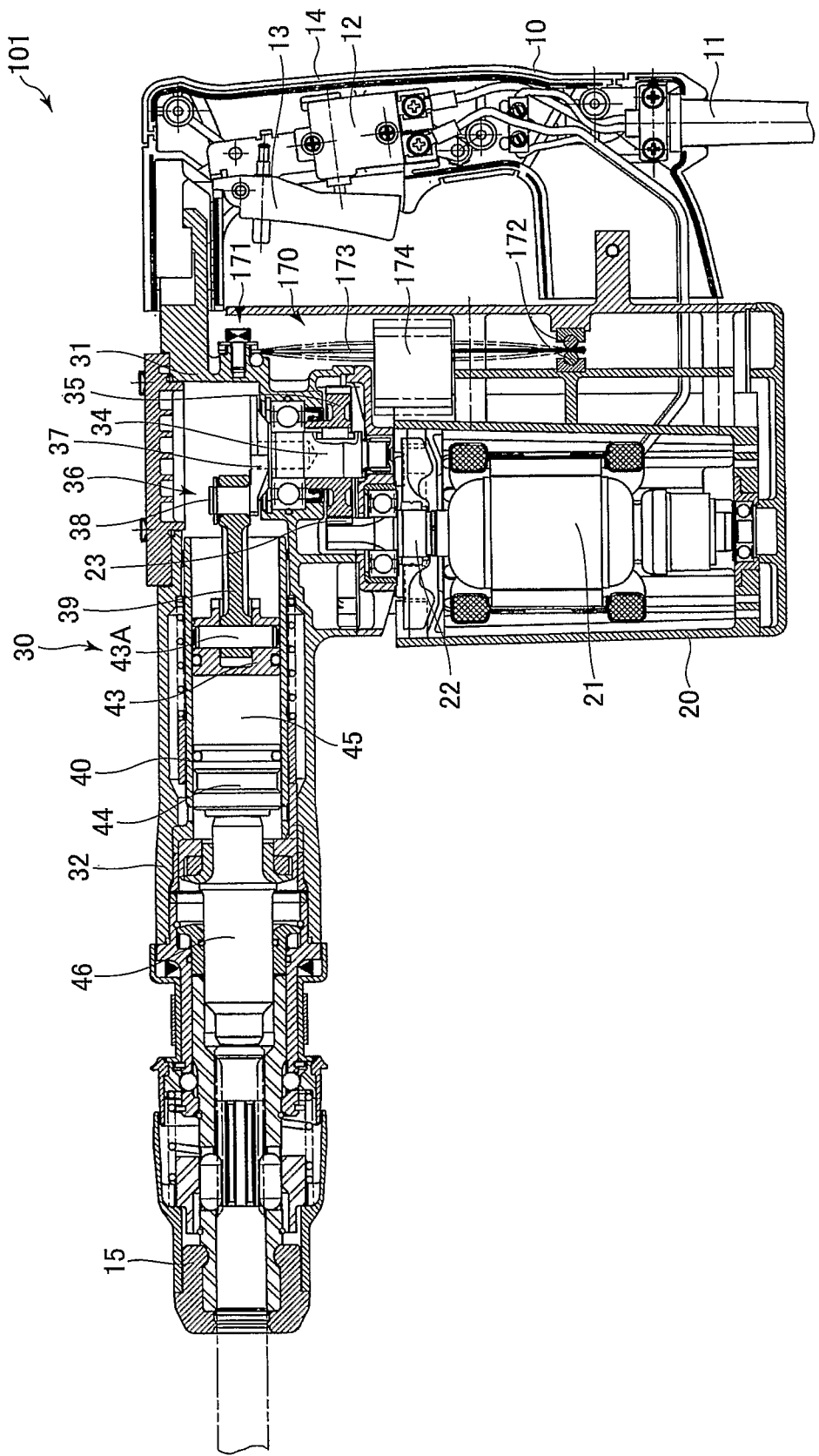
FIG. 3 is a cross-sectional view showing an impact tool according to a second embodiment of the present invention.
Figure 4:
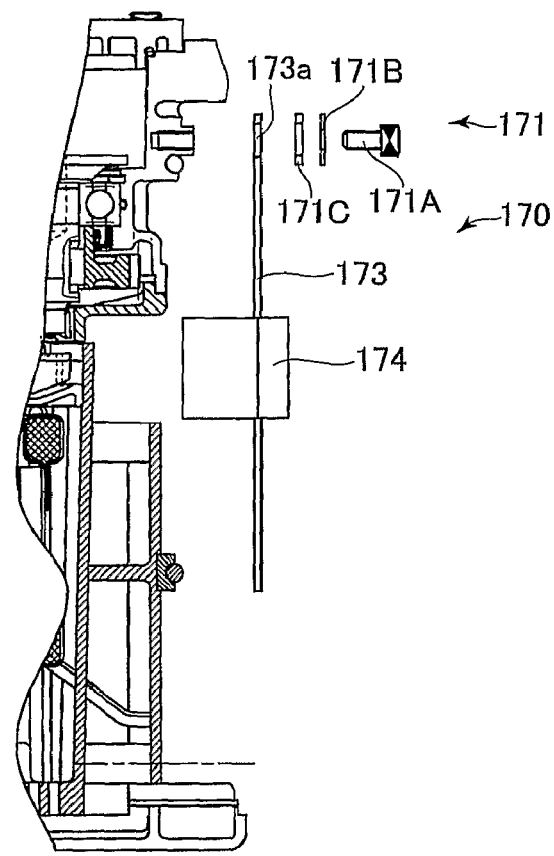
FIG. 4 is an exploded view of a counterweight mechanism of the impact tool according to the second embodiment of the present invention.
Figure 5:
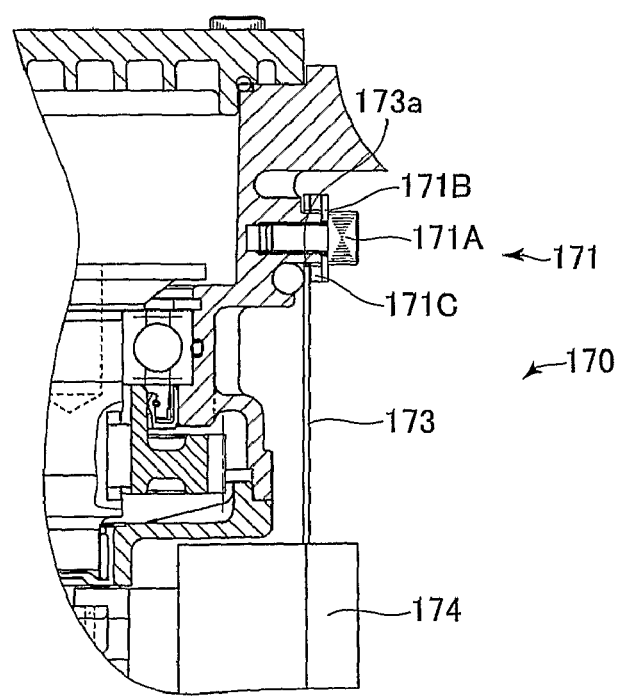
FIG. 5 is an enlarged view of the counterweight mechanism of the impact tool according to the second embodiment of the present invention.

Next, an electrical power tool according to a second embodiment of the present invention will be described while referring to FIGS. 3 through 5. The electrical power tool of the present invention is applied to an impact tool 101. Like parts and components that are the same as those of the first embodiment will be assigned the same reference numerals to avoid duplicating descriptions, and only different aspects will be described. The impact tool 101 according to the second embodiment does not include the rotating cylinder 50 and the control unit 24 used in the impact tool 1 of the first embodiment. Therefore, no rotation is applied to the working tool during the operation of the impact tool 1, and the electrical motor 21 rotates at a fixed speed.

As in the impact tool 1 of the first embodiment, a counterweight mechanism 170 is provided in the motion conversion housing 31 and is disposed in opposition to the handle 10. The counterweight mechanism 170 includes a support member 171, a pair of support members 172, a counterweight holding member 173, and a counterweight 174. The support member 171 will be described while referring to FIGS. 4 and 5. The support member 171 includes a bolt 171A, a washer 171B, and a spacer 171C. The pair of support members 172 is made from rubber. The counterweight holding member 173 is made from a leaf spring and is formed with a bolt insertion hole 173a. The upper end portion of the counterweight holding member 173 is fixed to the motion conversion housing 31 by inserting the bolt 171A through the washer 171B, the spacer 171C, and the bolt insertion hole 173a. The lower end portion of the counterweight holding member 173 is positioned between the pair of the support members 172 and is supported by the support members 172 with line contacts. Since the support members 172 is made from rubber, the lower end portion of the counterweight holding member 173 is supported by the support members 172 while being capable of moving up and down with respect to the support members 172. The counterweight 174 is fixed roughly in the vertical center of the counterweight holding member 173.

The counterweight mechanism 170 of the second embodiment also can be efficiently reduced the vibration of the impact tool 101 caused by the reciprocation motion of the striking member 44. Also, as described above, the counterweight mechanism 170 includes the bolt 171A, the washer 171B, and the spacer 171C. Thus, by adjusting the tightness of the bolt 171A, the load applied to the upper end portion of the counterweight holding member 173 can be controlled. Hence, the vibration of the counterweight holding member 173 and the counterweight 174 can be controlled and the resonance frequency of the counterweight mechanism 170 can be adjusted. Other advantages of the impact tool 101 are similar to the advantages of the impact tool 1 according to the first embodiment.

Figure 6:
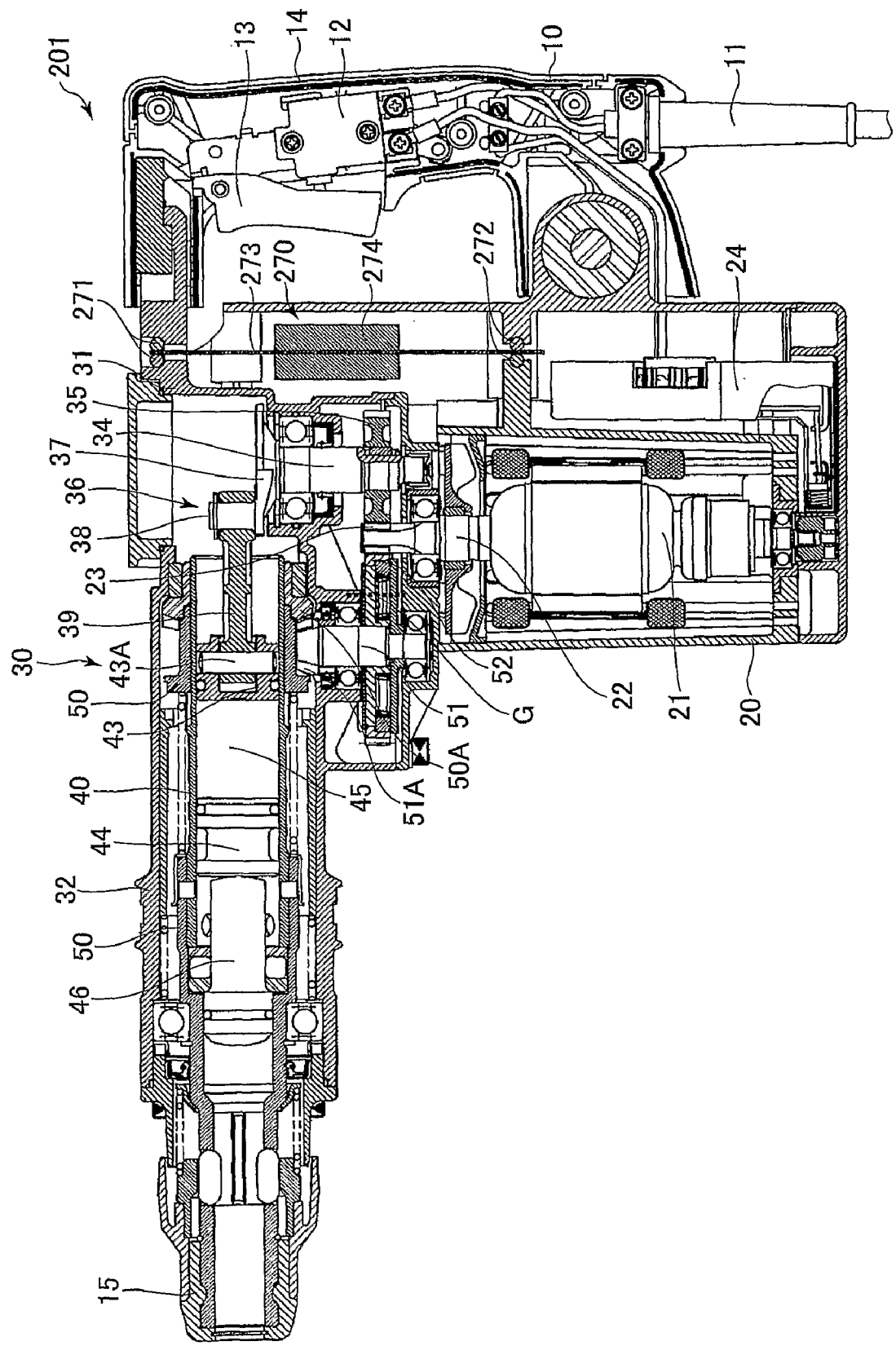
FIG. 6 is a cross-sectional view showing an impact tool according to a third embodiment of the present invention.

Next, an electrical power tool according to a third embodiment of the present invention will be described while referring to FIG. 6. The electrical power tool of the present invention is applied to an impact tool 201. Like parts and components that are the same as those of the first embodiment will be assigned the same reference numerals to avoid duplicating descriptions, and only different aspects will be described.

A counterweight mechanism 270 is provided in the motion conversion housing 31 and is disposed in opposition to the handle 10. The counterweight mechanism 270 is positioned above the control unit 24 and is also positioned above a line that passes through the center of gravity G of the impact tool 201 and that extends parallel to the directions of the reciprocation motion of the piston 43. The counterweight mechanism 270 includes a pair of support members 271, a pair of support members 272, a counterweight holding member 273, and a counterweight 274. The pair of support members 271 is made from rubber and is fixed to the upper section of the motion conversion housing 31. The pair of support members 272 is also made from rubber and is fixed to the motion conversion housing 31.

The counterweight holding member 273 is made from a leaf spring. The upper end portion of the counterweight holding member 273 is positioned between the pair of support members 271 and is supported by the support members 271 with line contacts. Since the pair of support members 271 is made from rubber, the upper end portion of the counterweight holding member 273 is supported by the support members 271 while being capable of moving up and down with respect to the support members 271. The lower end of the counterweight holding member 273 is positioned between the pair of support members 272 and is supported by the support members 272 with line contact. Since the pair of support members 272 is made from rubber, the lower end portion of the counterweight holding member 273 is supported by the support members 272 while being capable of moving up and down with respect to the support members 272. Thus, the counterweight 274 is doubly supported on both ends by the counterweight holding member 273. The counterweight 274 is fixed to roughly in the vertical center of the counterweight holding member 273.

The counterweight mechanism 270 according to the third embodiment also can be efficiently reduced the vibration of the impact tool 201 caused by the reciprocation motion of the striking member 44. Also, as described above, the counterweight mechanism 270 is positioned above the line that passes through the center of gravity G of the impact tool 201 and that extends parallel to the directions of the reciprocation motion of the piston 43. Therefore, the rotation moment centering on the center of gravity G caused by the reciprocation motion of the piston 43 can be reduced. Other advantages of the impact tool 201 are similar to the advantages of the impact tool 1 of the first embodiment.

Figure 7:
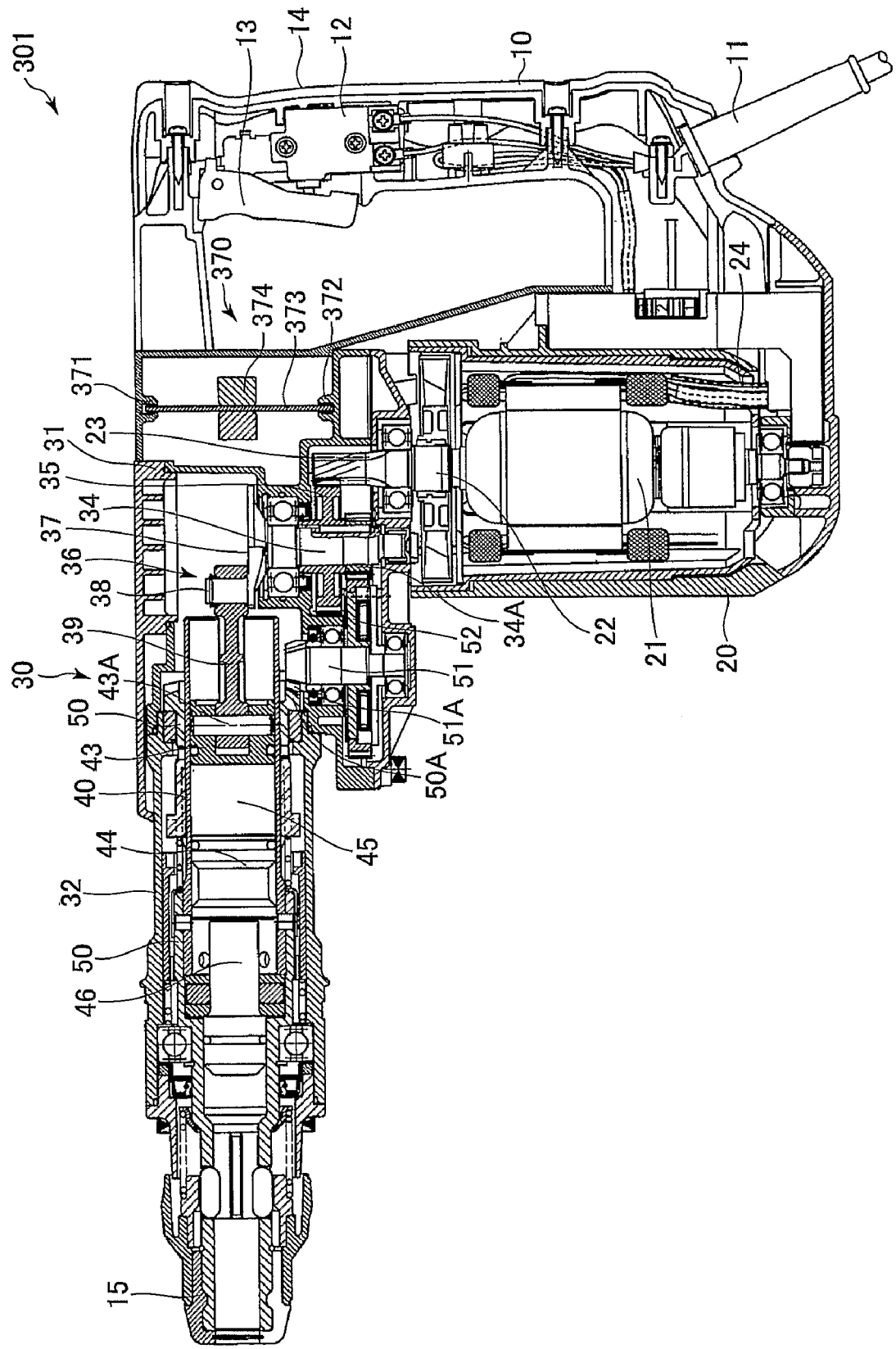
FIG. 7 is a cross-sectional view showing an impact tool according to a fourth embodiment of the present invention.

Next, an electrical power tool according to a fourth embodiment of the present invention will be described while referring to FIG. 7. The electrical power tool of the present invention is applied to an impact tool 301. Like parts and components that are the same as those of the first embodiment will be assigned the same reference numerals to avoid duplicating descriptions, and only different aspects will be described.

The crank shaft 34 is positioned at the front side of the pinion gear 23. A third gear 34A is coaxially fixed to the crank shaft 34 on the lower side of the first gear 35. The rotation transmission shaft 51 is positioned at the front side of the crank shaft 34. The second gear 52 is meshingly engaged with the third gear 34A. The rotation of the electrical motor 21 is transmitted to the rotation transmission shaft 51 by way of the pinion gear 23, the first gear 35, the third gear 34A, and the second gear 52. The rotation of the rotation transmission shaft 51 is transmitted to the rotating cylinder 50 by way of the first bevel gear 51A and the second bevel gear 50A, resulting in rotation of the rotating cylinder 50. The rotation of the rotating cylinder 50 applies a rotation force to a working tool (not shown).

A counterweight mechanism 370 is provided in a space above the electrical motor 21. The space is created by positioning the crank shaft 34 on the front side of the pinion gear 23. The counterweight mechanism 370 includes a support member 371, a support member 372, a counterweight holding member 373, and a counterweight 374. The support members 371 and 372 have a U-shaped, and the opening of the support member 371 opposes the opening of the support member 372 with each other. The counterweight holding member 373 is made from a leaf spring, and each end thereof is inserted into the openings of the support members 371 and 372, respectively. The counterweight holding member 373 is supported by the support members 371 and 372 with line contacts. The counterweight 374 is fixed to roughly in the vertical center of the counterweight holding member 373. Thus, the counterweight 374 is doubly supported on both ends by the counterweight holding member 373.

The counterweight mechanism 370 according to fourth embodiment also can be efficiently reduced the vibration of the impact tool 301 caused by the reciprocation motion of the striking member 44. Also, as described above, the counterweight mechanism 370 is positioned in a space above the electrical motor 21 created by positioning the crank shaft 34 on the front side of the pinion gear 23. Accordingly, the open space above the electrical motor 21 can be used efficiently and enlargement of the impact tool 301 by providing the counterweight mechanism 370 can be prevented. Other advantages of the impact tool 301 are similar to the advantages of the impact tool 1 according to the first embodiment.

Figure 8:
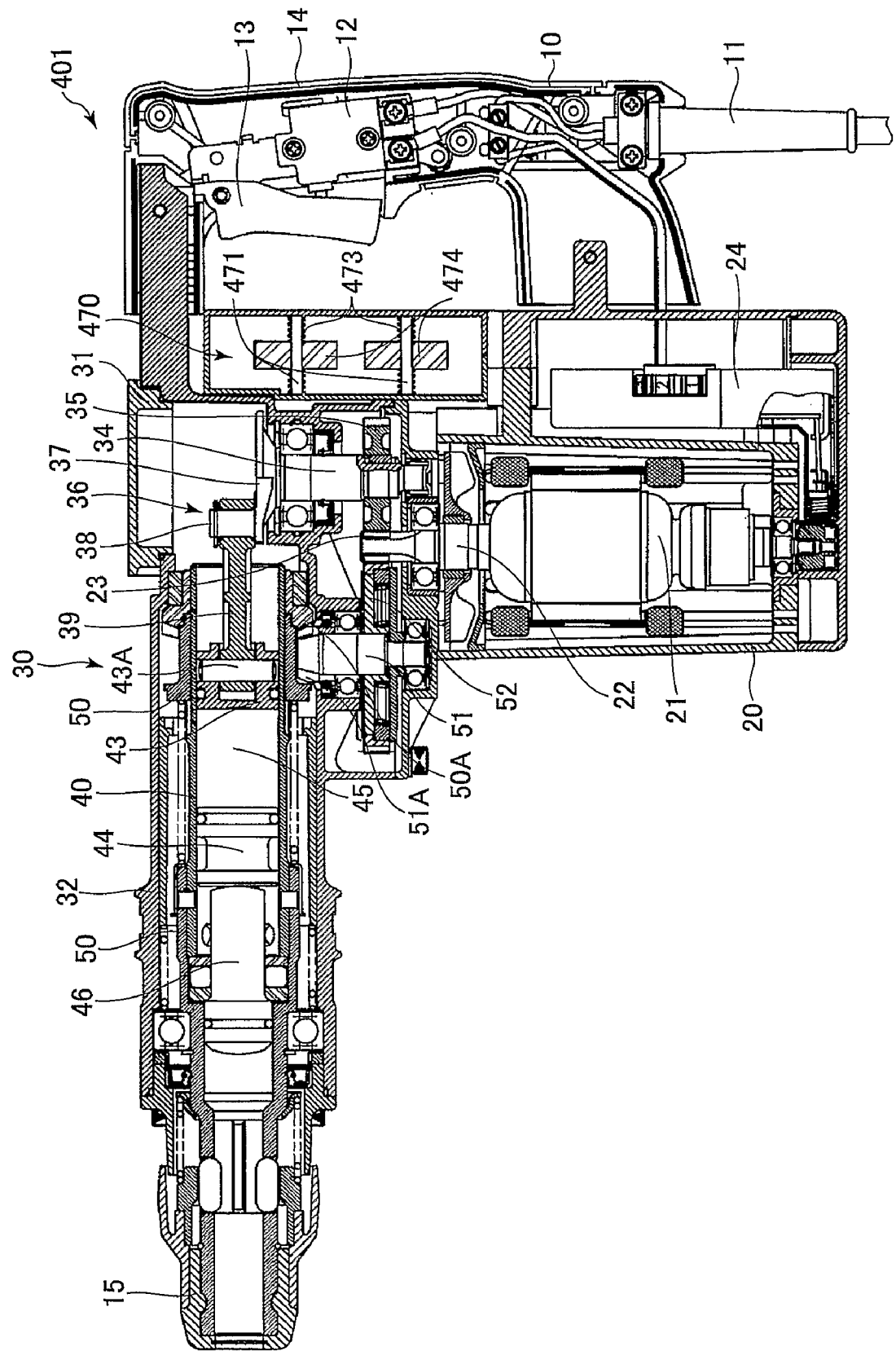
FIG. 8 is a cross-sectional view showing an impact tool according to a fifth embodiment of the present invention.

Next, an electrical power tool according to a fifth embodiment of the present invention will be described while referring to FIG. 8. The electrical power tool of the present invention is applied to an impact tool 401. Like parts and components that are the same as those of the first embodiment will be assigned the same reference numerals to avoid duplicating descriptions, and only different aspects will be described.

A counterweight mechanism 470 is provided above the control unit 24 and is disposed in opposition to the handle 10. The counterweight mechanism 470 includes two support members 471, four springs 473, and two counterweights 474. The two support members 471 extend parallel to the directions of the reciprocation motion of the piston 43 and are fixed to the motion conversion housing 31. Each of the two counterweights 474 is slidably supported by the support members 471, respectively. Each of the four springs 473 is positioned on each ends of the counterweights 474 and is interposed between the counterweights 474 and the motion conversion housing 31.

The counterweight mechanism 470 according to this embodiment also can be reduced efficiently the vibration of the impact tool 401, which is caused by the reciprocation motion of the striking member 44, by the vibration of the counterweights 474. Other advantages of the impact tool 401 are similar to the advantages of the impact tool 1 according to the first embodiment.

Figure 9:
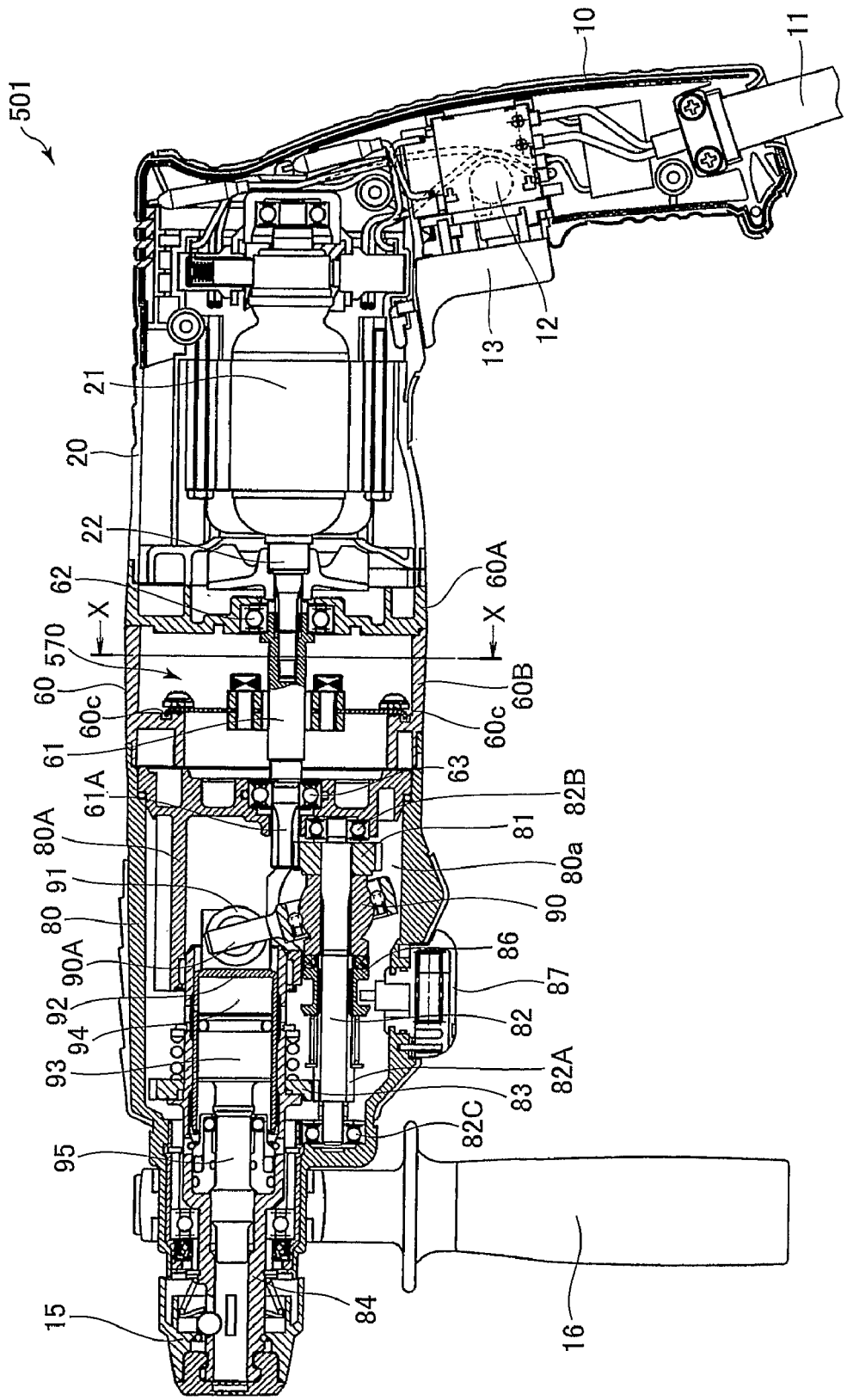
FIG. 9 is a cross-sectional view showing an impact tool according to a sixth embodiment of the present invention.
Figure 10:
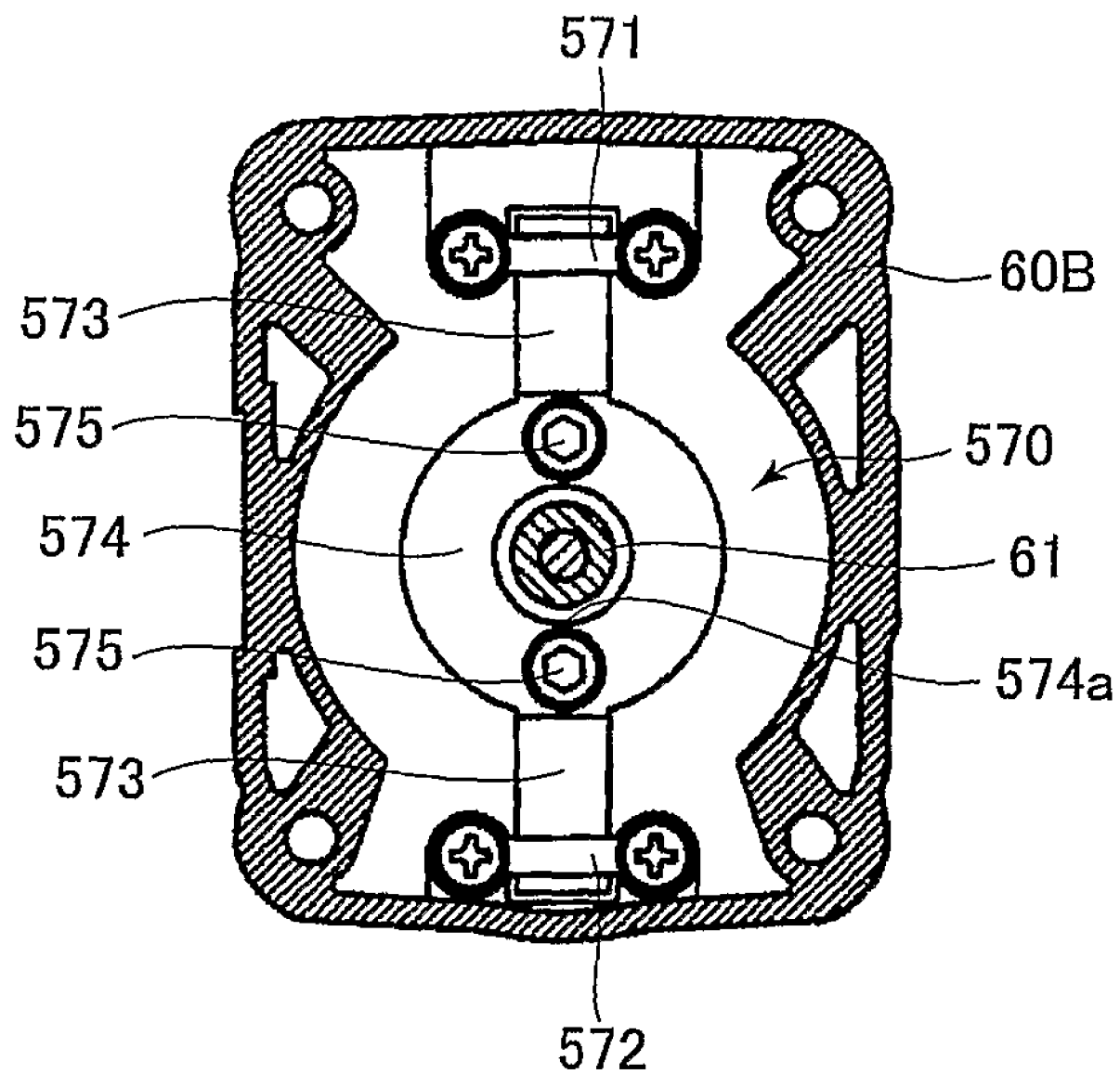
FIG. 10 is a cross-sectional view of the impact tool taken along a line X-X in FIG. 9.
Figure 11:
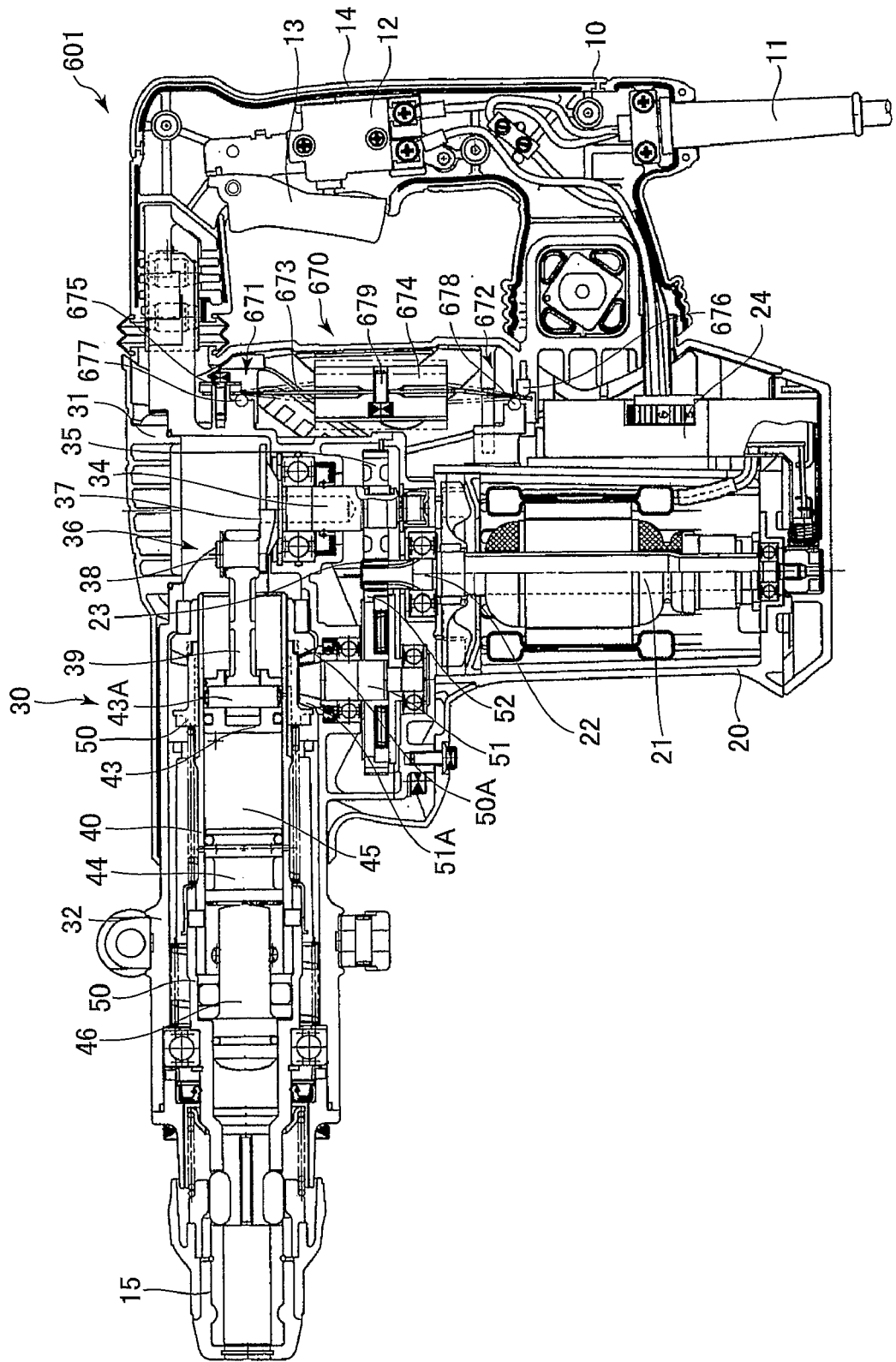
FIG. 11 is a cross-sectional view showing an impact tool according to a seventh embodiment of the present invention.

Next, an electrical power tool according to a sixth embodiment of the present invention will be described while referring to FIGS. 9 and 10. The electrical power tool of the present invention is applied to an impact tool 501. The impact tool 501 includes a casing having the handle 10, the motor housing 20, a weight housing 60, and a gear housing 80.

The power cable 11 is attached to the handle 10. The handle 10 houses the switch mechanism 12. The trigger 13 that can be manipulated by the user is mechanically connected to the switch mechanism 12. The switch mechanism 12 is connected to an external power source (not shown) through power cable 11. By operating the trigger 13, the switch mechanism 12 can be connected to and disconnected from the external power source.

The motor housing 20 is provided on the front side of the handle 10. The handle 10 and the motor housing 20 are formed integrally from plastic. The electrical motor 21 is accommodated in the motor housing 20. The electrical motor 21 includes the output shaft 22 and outputs rotational drive force.

The weight housing 60 is located on the front side of the motor housing 20 and is made from resin. The weight housing 60 includes a first weight housing 60A opposing the motor housing 20 and a second weight housing 60B opposing the gear housing 80. A first intermediate shaft 61 is provided in the weight housing 60 and extends in a direction that the output shaft 22 extends. The first intermediate shaft 61 is rotatably support by bearings 62 and 63. The rear end portion of the first intermediate shaft 61 is connected to the output shaft 22. The front end portion of the first intermediate shaft 61 is positioned in the gear housing 80 and is provided with a fourth gear 61A.

A counterweight mechanism 570 is provided in the weight housing 60. As shown in FIG. 10, which is a cross-sectional view taken along the X-X line in FIG. 9, the counterweight mechanism 570 includes support members 571 and 572, a pair of counterweight holding members 573, a counterweight 574, and a bolt 575. The support members 571 and 572 are provided at the upper and lower end portions of the second weight housing 60B, respectively. The pair of counterweight holding members 573 is made from leaf springs. As shown in FIG. 9, the upper and lower end portions of the counterweight holding members 573 have roughly an L-shaped, and each of the distal ends of the upper and lower end portions of the counterweight holding members 573 is positioned in each of recesses 60c formed in the second weight housing 60B, respectively. The upper end portion of the counterweight holding members 573 is supported by the support member 571, and the lower end portion of the counterweight holding members 573 is supported by the support member 572.

The counterweight 574 has a roughly circular cross-section and is formed with a shaft insertion hole 574a formed at the center thereof. The counterweight 574 is fixed to the counterweight holding members 573 by bolts 575. Hence, the counterweight 574 is doubly supported on its both ends by the pair of counterweight holding members 573. The first intermediate shaft 61 is inserted through the shaft insertion hole 574a.

The gear housing 80 is located on the front side of the second weight housing 60B and is made from resin. A metal partition member 80A is disposed in the gear housing 80 and partitions the gear housing 80 and the weight housing 60. The gear housing 80 and the partition member 80A forms a decelerating chamber 80a, which is a mechanism chamber accommodating a rotation transmission mechanism described later. A second intermediate shaft 82 is rotatably supported on the gear housing 80 and the partition member 80A via a bearings 82B and 82C, and extends parallel to the output shaft 22. A side handle 16 is provided near the tool support portion 15 of the gear housing 80, described later.

A fifth gear 81 meshingly engaged with the fourth gear 61A is coaxially fixed to the second intermediate shaft 82 on the electrical motor 21 side thereof. A gear 82A is formed on the front end portion of the second intermediate shaft 82 to be meshingly engaged with a sixth gear 83, described later. A cylinder 84 is provided above the second intermediate shaft 82 in the gear housing 80. The cylinder 84 extends parallel to the second intermediate shaft 82 and is rotatably supported on the partition member 80A. The sixth gear 83 is fixed to the outer periphery of the cylinder 84 and is meshingly engaged with the gear 82A described above so that the cylinder 84 can rotate around its central axial.

The tool support portion 15 mentioned above is provided on the front side of the cylinder 84, and a working tool (not shown) is capable of attaching to or detaching from the tool support portion 15. A clutch 86 is splined to the intermediate section of the second intermediate shaft 82. The clutch 86 is urged by a spring toward the electrical motor 21. The clutch 86 can be switched by means of a change lever 87 positioned below the gear housing 80 between a hammer drill mode (the position shown in FIG. 9) and a drill mode (with the clutch 86 moved toward the front). A motion converter 90 that converts rotational motion into reciprocation motion is rotatably provided on the outer periphery of the second intermediate shaft 82 on the electrical motor 21 side of the clutch 86. The motion converter 90 has an arm 90A that is capable of reciprocating back-and-forth the impact tool 501 as a result of the rotation of the second intermediate shaft 82.

When the clutch 86 is switched to the hammer drill mode using the change lever 87, the clutch 86 engages the second intermediate shaft 82 with the motion converter 90. The motion converter 90 is connected to and work with a piston 92 provided in the cylinder 84 through a piston pin 91. The piston 92 is slidably mounted in the cylinder 84 and is capable of a reciprocation motion parallel to the second intermediate shaft 82. A striking member 93 is provided in the piston 92 and is slidably provided along the inner periphery of the cylinder 84. An air chamber 94 is formed among the cylinder 84, the piston 92, and the striking member 93. An intermediate member 95 is supported in the cylinder 84 on the opposite side of the striking member 93 from the air chamber 94. The intermediate member 95 is slidably provided against the cylinder 84 along the direction of the motion of the piston 92. A working tool (not shown) is positioned on the opposite side of the intermediate member 95 from the striking member 93. Hence, the striking member 93 strikes the working tool (not shown) through the intermediate member 95.

Rotation output of the motor 21 is transmitted to the second intermediate shaft 82 by way of the first intermediate shaft 61, the fourth gear 61A, and the fifth gear 81. The rotation of the second intermediate shaft 82 is transmitted to the cylinder 84 by way of the meshing between the gear 82A and the sixth gear 83 mounted to the outer periphery of the cylinder 84. When the clutch 86 is in the hammer drill mode by operating the change lever 87, the clutch 86 is connected to the motion converter 90. Hence, the rotational driving force of the second intermediate shaft 82 is transmitted to the motion converter 90 through the clutch 86. The rotational driving force is converted to the reciprocation motion of the piston 92 on the motion converter 90 by way of the piston pin 91. The reciprocation motion of the piston 92 causes the pressure of the air inside the air chamber 94 formed between the striking member 93 and the piston 92 to repeatedly increase and decrease, thereby causing a reciprocation motion of the striking member 93. When the striking member 93 moves forward and collides with the rear end of the intermediate member 95, the impact force is applied to the working tool (not shown) through the intermediate element 95. In this manner, the rotational force and the impact force are simultaneously applied to the working tool (not shown) in the hammer drill mode.

If the clutch 86 is in the drill mode, the clutch 86 disengages the connection between the second intermediate shaft 82 and the motion converter, 90, and only the rotational driving force of the second intermediate shaft 82 is transmitted to the cylinder 84 through the gear 82A and the sixth gear 83. Accordingly, only rotational force is applied to the working tool (not shown).

When the impact tool 501 according to sixth embodiment is operated, a vibration having a roughly constant frequency is generated in the impact tool 501 due to the reciprocation motion of the striking member 93. The vibration is transmitted to the support members 571 and 572 by way of the second weight housing 60B. The vibration transmitted to the support members 571 and 572 is transmitted to the counterweight holding members 573 and the counterweight 574, and the counterweight 574 vibrates in the same directions as the directions of the reciprocation motion of the piston 92. The vibration of the impact tool 501 can be reduced by the vibration of the counterweight 574, thereby improving the operation of the impact tool 501.

Next, an electrical power tool according to a seventh embodiment of the present invention will be described while referring to FIGS. 11 through 18B. The electrical power tool of the present invention is applied to an impact tool 601. Like parts and components that are the same as those of the first embodiment will be assigned the same reference numerals to avoid duplicating descriptions, and only different aspects will be described. A counterweight mechanism 670 is provided in the motion conversion housing 31 and is disposed in opposition to the handle 10. Referring to FIG. 11 through FIG. 14, the counterweight mechanism 670 will be described in detail while referring to FIGS. 11 through 14. The counterweight mechanism 670 includes two support members 671 and 672, a counterweight holding member 673, and a counterweight 674. The support members 671 and 672 are located along a direction perpendicular to the directions of the reciprocation motion of the piston 43. The counterweight 674 is interposed between the support members 671 and 672. The support members 671 and 672 include first support members 675 and 676 and second support members 677 and 678 positioned closer to the counterweight 674 than the first support members 675 and 676 to the counterweight 674.

Figure 12:
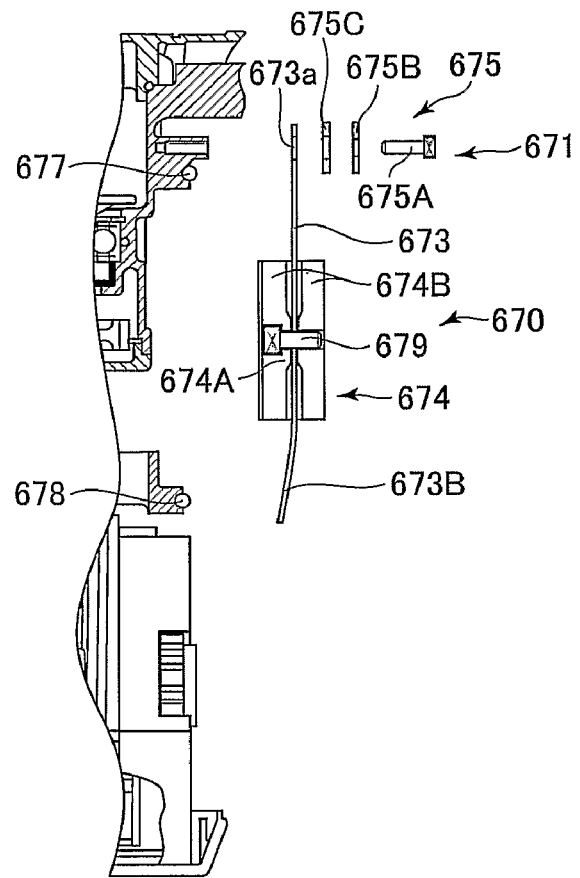
FIG. 12 is an exploded view of a counterweight mechanism of the impact tool according to the seventh embodiment of the present invention.
Figure 13:
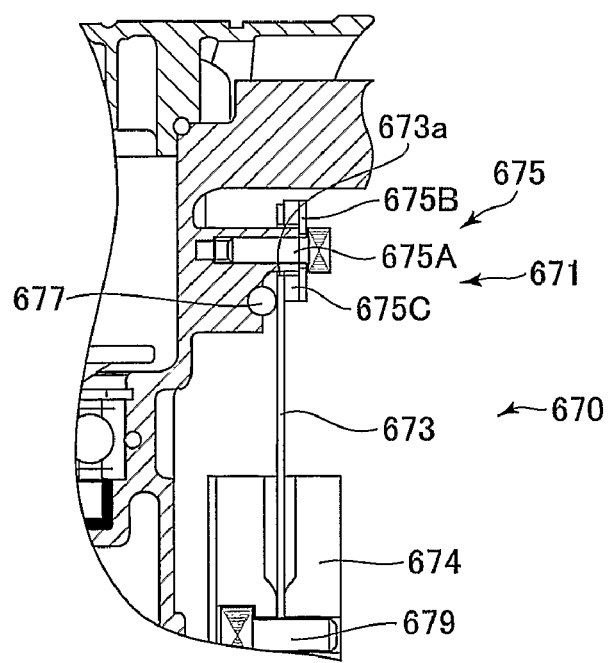
FIG. 13 is an enlarged view of the counterweight mechanism of the impact tool according to the seventh embodiment of the present invention.

As shown in FIGS. 12 and 13, the first support member 675 includes a bolt 675A, a washer 675B, and a spacer 675C. The counterweight holding member 673 is formed with a bolt insertion hole 673a. The bolt 675A is inserted through the washer 675B, the spacer 675C, and the bolt insertion hole 673a. Hence, the upper end portion of the counterweight holding member 673 is fixed to the motion conversion housing 31. The bolt insertion hole 673a (surrounding the bolt insertion hole 673a) of the counterweight holding member 673 serves as a drop prevention portion that prevents the counterweight holding member 673 from dropping out from the first support member 675. The upper end portion of the counterweight holding member 673 is blocked by the first support member 675 from moving in one direction (toward the rear side) of the directions (back-and-forth directions) for the reciprocation motion of the piston 43.

The second support member 677 is positioned below the first support member 675 and on the rear side of the counterweight holding member 673. The upper end portion of the counterweight holding member 673 is blocked by the second support member 677 from moving in another direction (toward the front side), opposite to the one direction, of the directions (back-and-forth directions) for the reciprocation motion of the piston 43. The first support member 676 is made from rubber and positioned on the lower end portion and on the rear side of the counterweight holding member 673. The first support member 676 blocks the lower end portion of the counterweight holding member 673 from moving toward the rear side. The second support member 678 is positioned above the first support member 676 and on the front side of the counterweight holding member 673. The second support member 678 blocks the lower end portion of the counterweight holding member 673 from moving toward the front side. The first support members 675 and 676 and the second support members 677 and 678 are positioned so that a rearward offset load F is applied to the counterweight holding member 673.

The counterweight holding member 673 is made from a leaf spring and includes a bent section 673B. The counterweight holding member 673 is supported by the first support member 676 and the second support member 678 on the bent section 673B. The first support member 676 is made from rubber. Hence, the lower end portion of the counterweight holding member 673 is supported by the first support member 676 while being capable of moving up and down with respect to the first support member 676. The counterweight 674 is formed from two components and is fixed by a bolt 679 at roughly the vertical center of the counterweight holding member 673. Thus, the counterweight 674 is doubly supported at its both ends by the counterweight holding member 673. The counterweight 674 has a center of gravity positioned at a center of a part of the counterweight holding member 673 positioned between the first support members 675 and 676.

Figure 14:
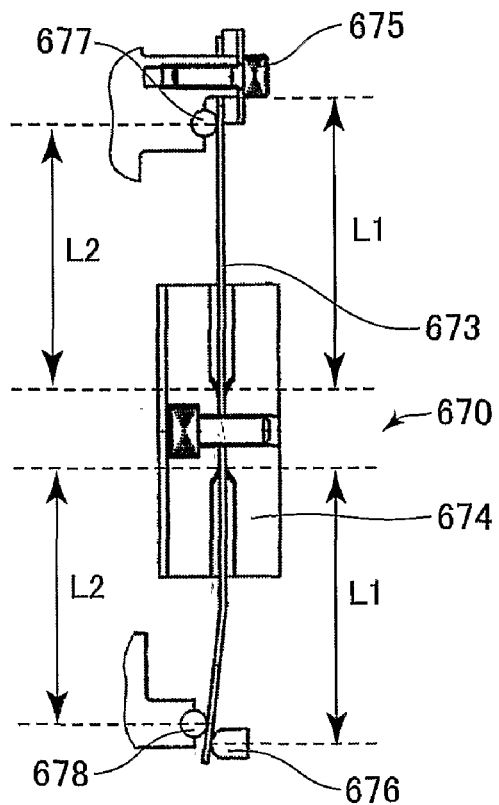
FIG. 14 is a view showing the counterweight mechanism of the impact tool according to the seventh embodiment of the present invention.

As shown in FIG. 12, the counterweight 674 includes a base 674A and two legs 674B. The base 674A extends in a direction perpendicular to the extending direction of the counterweight holding member 673. Each of the two legs 674B is connected to the ends of the base 674A and extends along and is separated from the counterweight holding member 673. Hence, the counterweight 674 has an H-shaped. As shown in FIG. 14, the distances from the first support members 675 and 676 to positions where the counterweight 674 is fixed to the counterweight holding member 673 are identical and each of the distances is indicated as a distance L1. The distances from the second support members 677 and 678 to positions where the counterweight 674 is fixed to the counterweight holding member 673 are identical and each of the distances is indicated as a distance L2.

Figure 15:
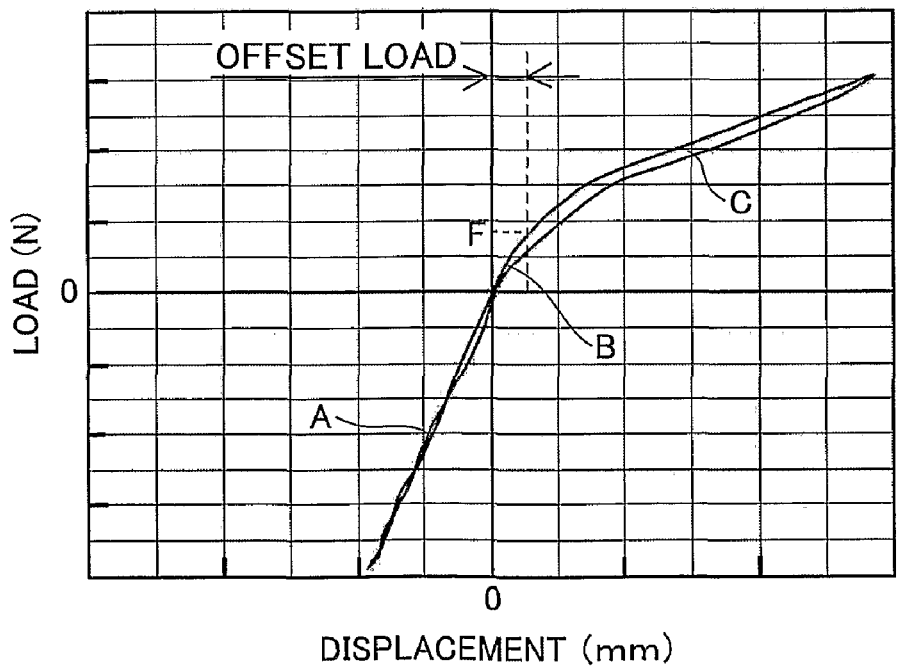
FIG. 15 is a view showing a relationship (load-displacement curve), between a displacement (horizontal axis) of a counterweight and a load (vertical axis) applied to a weight holding member due to the displacement, of the impact tool according to the seventh embodiment of the present invention.
Figure 16:
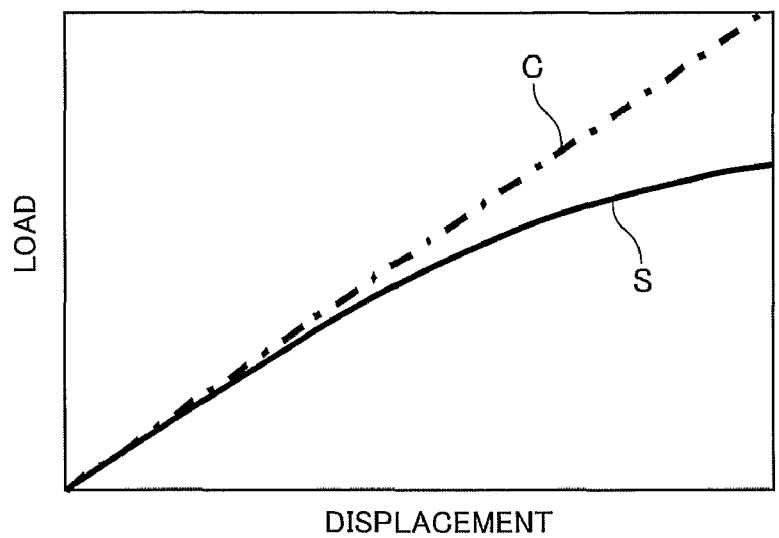
FIG. 16 is an explanatory diagram showing the relationship between load and displacement of a general coil spring and soft-spring characteristics.
Figure 17A:
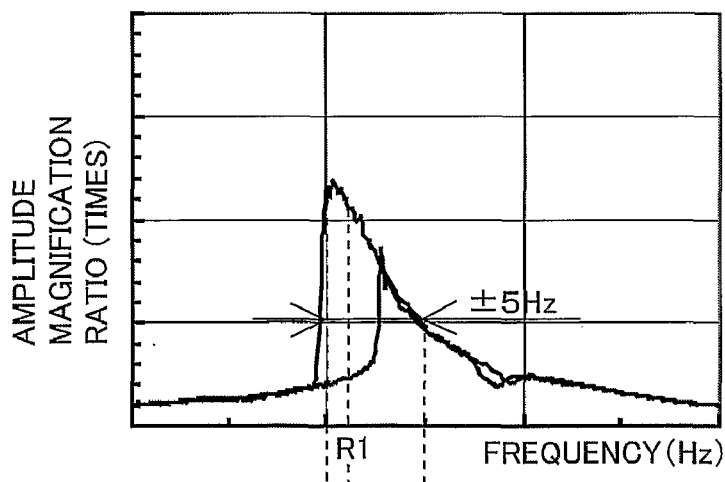
FIG. 17A is a view showing a relationship (frequency response curve), between a frequency (horizontal axis) of a vibration caused by a reciprocation motion of a striking member (the frequency of a vibration source) and an amplitude magnification ratio (vertical axis) of the counterweight caused by the vibration of the striking member, for the counterweight mechanism (a dynamic vibration absorber) of the impact tool according to the seventh embodiment of the present invention.
Figure 17B:
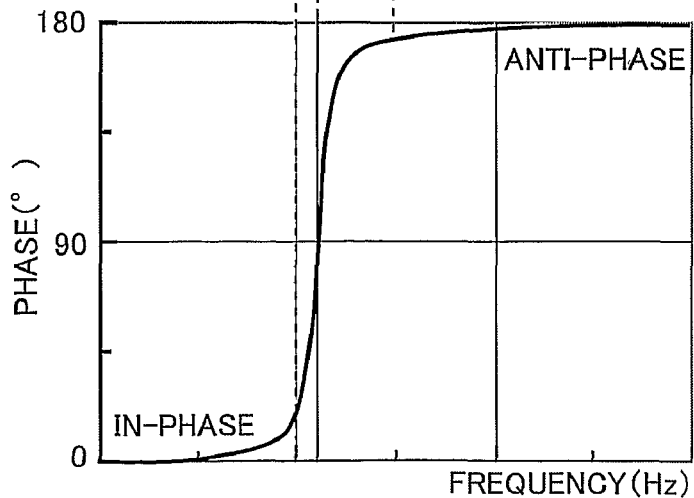
FIG. 17B is a view showing a relationship, between the frequency (horizontal axis) of the vibration source and the phase difference (vertical axis) between a vibration force and the vibration of the counterweight, for the counterweight mechanism (the dynamic vibration absorber) of the impact tool according to the seventh embodiment of the present invention.

Next, the vibration of the counterweight mechanism 670 will be described while referring to FIGS. 14 through 17. FIG. 15 shows a load-displacement curve that indicates the relationship between the displacement (the horizontal axis) of the counterweight 674 and the load (the vertical axis) applied to the counterweight holding member 673 due to the displacement of the counterweight 674. On the horizontal axis of FIG. 15, the rearward displacement of the counterweight 674 is positive. On the vertical axis of FIG. 15, the load applied to the counterweight holding member 673 when displacing the counterweight 674 rearward is positive. FIG. 17A shows a frequency response curve that indicates the relationship between the frequency (frequency of the vibration source, the horizontal axis) caused by the reciprocation motion of the striking member 44 and the amplitude magnification ratio (the vertical axis) of the counterweight 674 resulting from the vibration of the striking member 44. FIG. 17B shows the relationship between the frequency of the vibration source (the horizontal axis) and the phase difference between the vibration force and the vibration of the counterweight 674 (the vertical axis). FIG. 17A shows a resonance point R1. At the resonance point, the phase difference in FIG. 17B is 90 degrees.

When the counterweight 674 moves forward from an its initial position and returns to the initial position due to the vibration of the striking member 44, the counterweight holding member 673 is supported by the first support members 675 and 676 and the second support members 677 and 678. Accordingly, the relationship between the displacement of the counterweight 674 and the load applied to the counterweight holding member 673 depends on a spring constant $K_{L2}$ corresponding to the distance L2 (FIG. 14) of the counterweight holding member 673 (A in the third quadrant in FIG. 15). While the counterweight 674 is displaced rearward from the initial position until the load applied to the counterweight holding member 673 is identical to the offset load F applied by the first support members 675 and 676, the counterweight holding member 673 is supported by the first support members 675 and 676 and the second support members 677 and 678. Thus, until a load identical to the offset load F is applied to the counterweight holding member 673, the relationship between the displacement of the counterweight 674 and the load applied to the counterweight holding member 673 depends on the spring constant $K_{L2}$ corresponding to the distance L2 (FIG. 14) of the counterweight holding member 673 (B in the first quadrant in FIG. 15). When a load greater than the offset load F is applied to the counterweight holding member 673, the counterweight holding member 673 is supported by first support members 675 and 676. Therefore, the relationship between the displacement of the counterweight 674 and the load applied to the counterweight holding member 673 depends on a spring constant $K_{L1}$ corresponding to the distance L1 (FIG. 14) of the counterweight holding member 673 (C in the first quadrant in FIG. 15).

As described above, in the first quadrant, the relationship between the displacement of the counterweight 674 of the counterweight mechanism 670 according to this embodiment and the load applied to the counterweight holding member 673 has characteristics similar to those of a soft spring. As shown in FIG. 16, in a soft spring characteristic S, the slope of the increment for the load gradually decreases as displacement increases, in constant to the straight line C indicating the relationship between displacement and load in a general coil spring. Since the counterweight mechanism 670 has soft spring characteristics in the first quadrant, the frequency characteristics of the counterweight mechanism 670 are such that the resonance point R1 moves toward the low-frequency side, as shown in FIG. 17A.

Figure 18A:
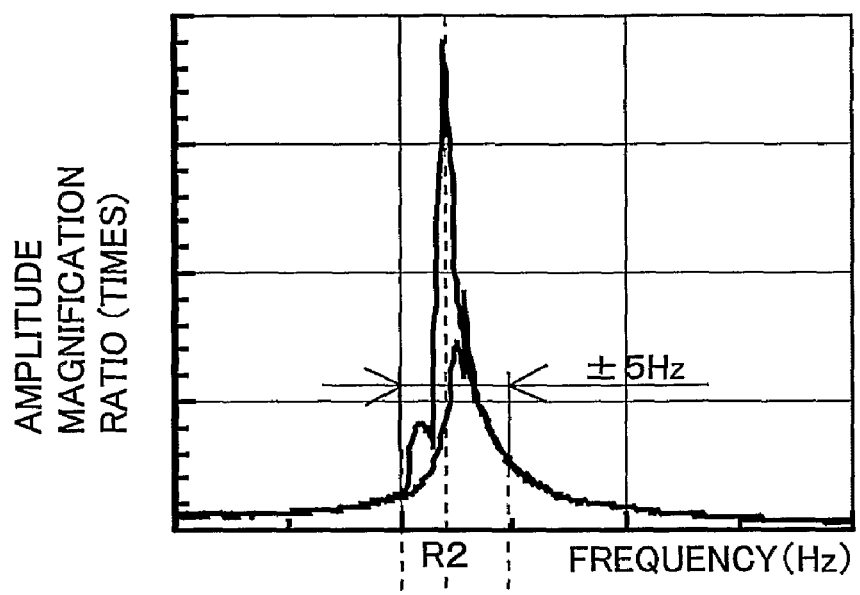
FIG. 18A is a view showing a relationship (frequency response curve) for a conventional counterweight mechanism (a dynamic vibration absorber) between a frequency (horizontal axis) of a vibration caused by a reciprocation motion of a striking member (the frequency of a vibration source) and an amplitude magnification ratio (vertical axis) of a counterweight caused by the vibration of the striking member.
Figure 18B:
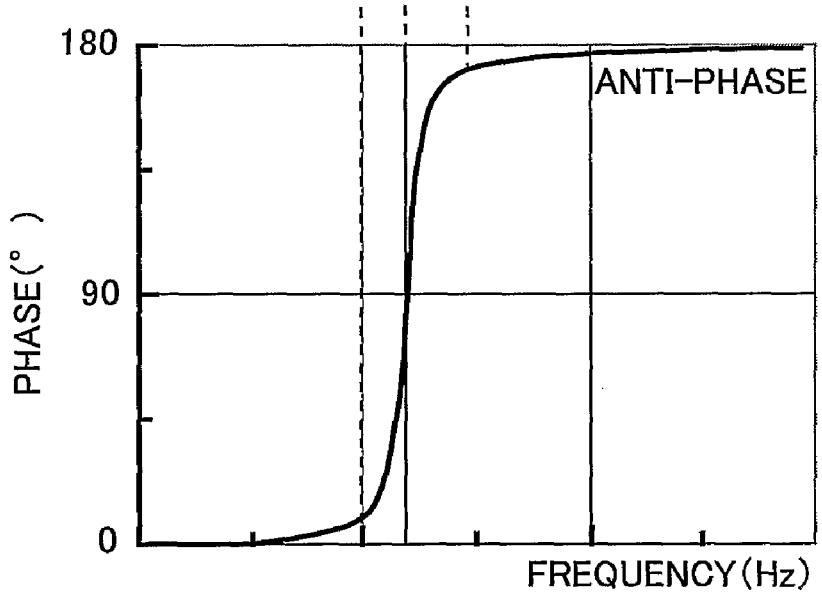
FIG. 18B is a view showing a relationship for a conventional counterweight mechanism (the dynamic vibration absorber) between the frequency (horizontal axis) of the vibration source and the phase difference (vertical axis) between a vibration force and the vibration of the counterweight.

FIG. 18A shows a frequency response curve indicating the relationship in a conventional counterweight mechanism (a dynamic vibration absorber) between the frequency of vibration resulting from reciprocation motion of a striking member (the frequency of the vibration source) and the amplitude magnification ratio of the counterweight as a result of the vibration of the striking member. The frequency response curve in FIG. 18A corresponds to the frequency curve in FIG. 17A. Similarly, FIG. 18B shows the relationship between the frequency of the vibration source and the phase difference between the vibration force and the counterweight, and corresponds to FIG. 17B. As shown in FIG. 18A, the frequency band excited in response to the frequency of the vibration is narrow in the conventional counterweight mechanism. Also, there is approximately ±5 Hz variation in the characteristic value (frequency) of the counterweight mechanism resulting from dimension tolerance and assembly tolerance in the counterweight holding member, the counterweight, and the like. Thus, the amplitude magnification ratio decreases even when the characteristic value of the counterweight mechanism is slightly shifted from the frequency of the vibration resulting from the impact of the impact tool. Hence, the vibration of the impact tool cannot be reduced. Also, the amplitude magnification ratio at the resonance frequency of the counterweight mechanism is high, resulting in greater counterweight vibration than necessary. Accordingly, the counterweight holding member must be made stronger.

As shown in FIGS. 18A and 18B, the phase difference relative to the vibration force is 90 degrees delay at the resonance point R2. When the vibration frequency ω resulting from the impact of the impact tool is lower than the characteristic value $\omega_n$ (the resonance frequency) of the counterweight mechanism, the phase difference approaches 0 degree (in-phase). On the other hand, when the vibration frequency ω is higher than the characteristic value $\omega_n$ (the resonance frequency), the phase difference becomes anti-phase. It is necessary to drive the counterweight mechanism in anti-phase for efficiently reducing the vibration force. However, the excitation frequency band for anti-phase is extremely narrow in the conventional counterweight mechanism.

As shown in FIGS. 17A and 17B, however, in the counterweight mechanism 670 according to this embodiment, the band at which the counterweight 674 vibrates in anti-phase with respect to the vibration force and the excitation frequency band of the counterweight 674 can be made broader, and a more suitable amplitude magnification ratio can be provided. Thus, the vibration suppression motion of the counterweight 674 against the vibration of the impact tool 601 due to impact can be prevented from the effects of dimension tolerance and assembly tolerance in the counterweight holding member, the counterweight, and the like and variations in the rotating speed of the electrical motor 21. As a result, the vibration of the impact tool 601 due to impact can be efficiently reduced and the operation of the impact tool 601 can be improved.

Since the counterweight mechanism 670 has a simple structure, a large number of parts such as expensive cylinders are not needed. The vibration of the impact tool 601 can be reduced without leading to a increased size, higher expenses, reduced visibility, and the like in the impact tool 601. The spring constant of the counterweight holding member 673 in the moving direction of the counterweight 674 can be decreased depending on increase of the displacement of the counterweight 674 when the counterweight 674 is moved from its initial position to at least one side of the counterweight 674 (one direction of the reciprocation motion). Accordingly, the impact tool 601 with low vibration, a compact size, and low cost can be provided.

The counterweight holding member 673 includes the bent section 673B. Hence, when the counterweight holding member 673 is supported by multiple support members, i.e., the first support members 675 and 676 and the second support members 677 and 678, the counterweight holding member 673 is prevented from separating from each of the support members. Accordingly, the unexpected initial deformations during the production process of the counterweight holding member 673 can be corrected. Also, the lower end of the counterweight holding member 673 is supported by the support members 676 and 678 while being capable of moving up and down with respect to the first support member 676. Therefore, the counterweight holding member 673 and the counterweight 674 can be vibrated smoothly in the same directions as the directions for the reciprocation motion of the piston 43.

The first support member 675 is includes the bolt 675A, the washer 675B, and the spacer 675C, as described above. Thus, by adjusting the tightness of the bolt 675A, the load applied to the upper end portion of the counterweight holding member 673 can be controlled. Hence, the vibration of the counterweight holding member 673 and the counterweight 674 can be controlled and characteristic vibration frequency and damping of the counterweight mechanism 670 can be adjusted arbitrarily. Accordingly, a vibration control mechanism (the counterweight mechanism 670) suited for various types of electrical power tools can be provided.

Furthermore, counterweight 674 includes the base 674A and two legs 674B. The base 674A extends in a direction perpendicular to the extending direction of the counterweight holding member 673. Each of the two legs 674B extends from the ends of the base 674A and on either side of the counterweight holding member 673 with a predetermined distance. Hence, the counterweight 674 has the H-shaped. As a result, the length of the counterweight holding member 673 needed to obtain a desired resonance frequency can be reduced, thereby providing a compact overall size for the counterweight mechanism 670. The counterweight 674 has a center of gravity positioned at a center of a part of the counterweight holding member 673 positioned between the first support members 675 and 676. Accordingly, the counterweight holding member 673 and the counterweight 674 can be vibrated smoothly in the same directions as the directions for the reciprocation motion without swinging the counterweight 674. The counterweight mechanism 670 according to this embodiment is most effective against vibrations generated by the reciprocation motion of a component, such as the striking member 44, having a certain amount of mass.

Figure 19:
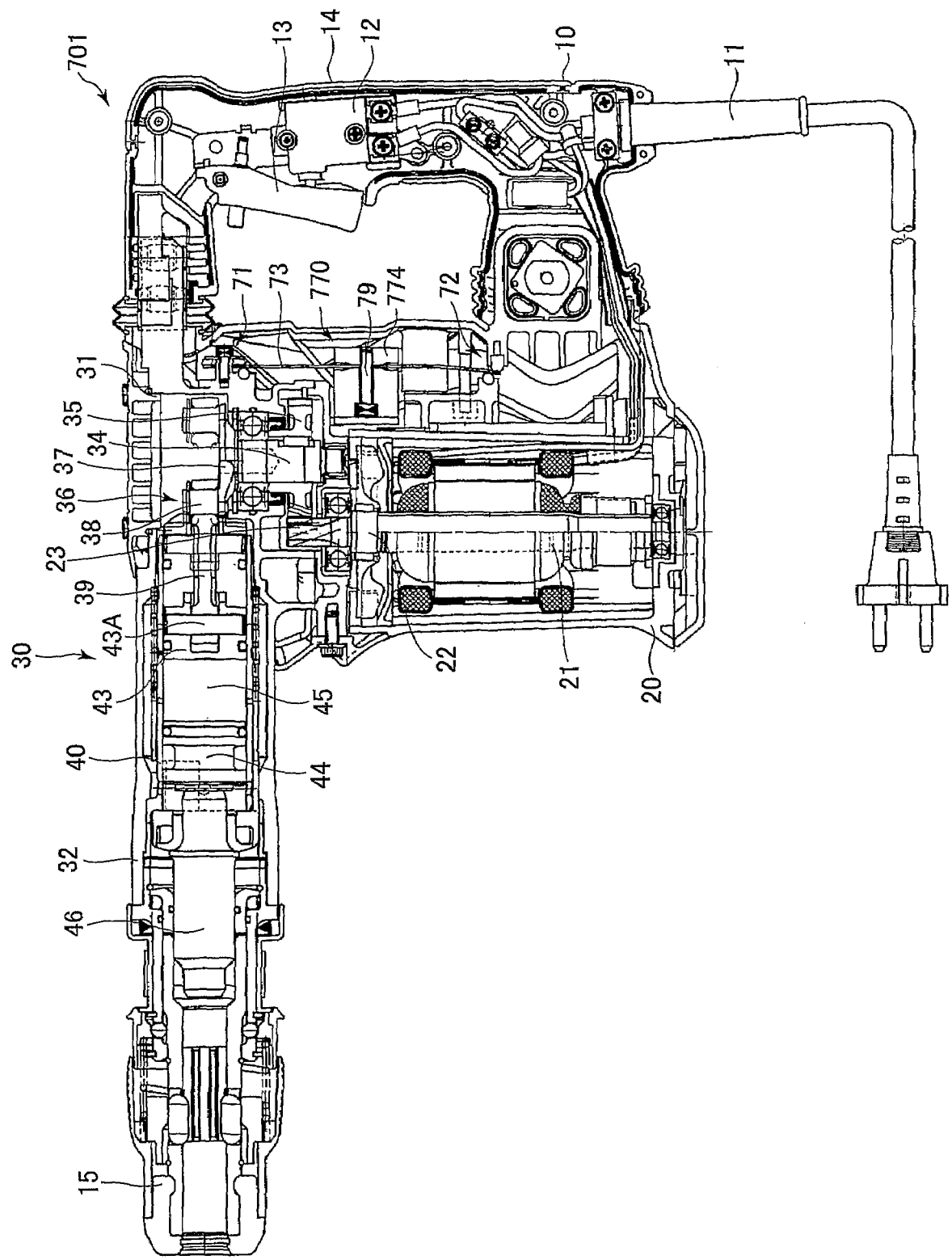
FIG. 19 is a cross-sectional view showing an impact tool according to an eighth embodiment of the present invention.

Next, an electrical power tool according to an eighth embodiment of the present invention will be described while referring to FIG. 19. The electrical power tool of the present invention is applied to an impact tool 701. Like parts and components that are the same as those of the seventh embodiment will be assigned the same reference numerals to avoid duplicating descriptions, and only different aspects will be described. The impact tool 701 according to the eighth embodiment does not include the rotating cylinder 50 and the control unit 24 used in the impact tool 601 from the seventh embodiment. Therefore, no rotation is applied to the working tool (not shown) during the operation of the impact tool 701, and the electrical motor 21 rotates at a fixed speed. A counterweight mechanism 770 according to the eighth embodiment has the same structure as the counterweight mechanism 670 of the seventh embodiment except for the difference in shape of a counterweight 774.

Accordingly, in the impact tool 701 according to the eighth embodiment, the counterweight mechanism 770 is substantially similar to the counterweight mechanism 670 of the seventh embodiment, and similar advantages as those of the impact tool 601 of the seventh embodiment are provided.

Figure 20:
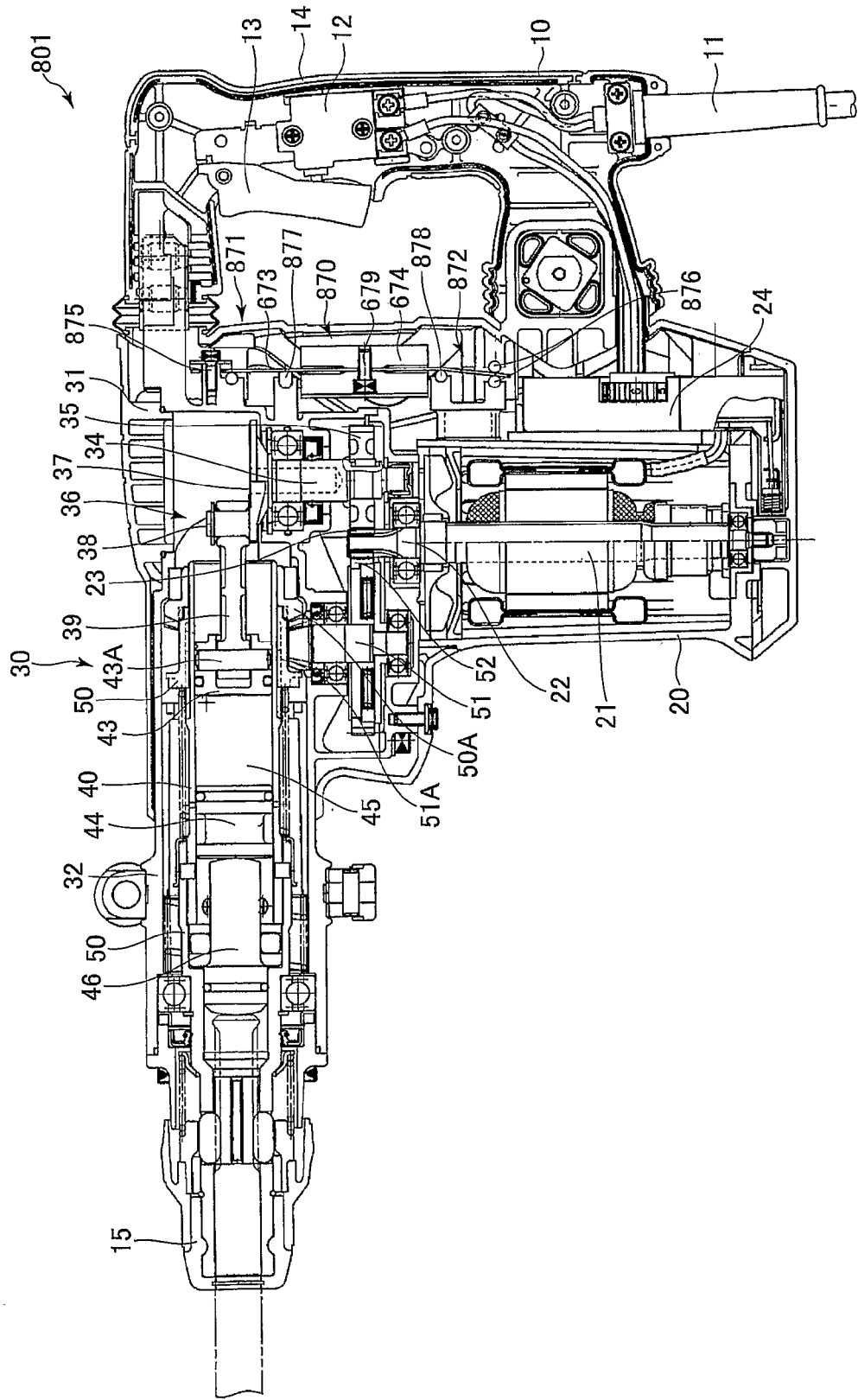
FIG. 20 is a cross-sectional view showing an impact tool according to a ninth embodiment of the present invention.

Next, an electrical power tool according to a ninth embodiment of the present invention will be described while referring to FIG. 20. The electrical power tool of the present invention is applied to an impact tool 801. Like parts and components that are the same as those of the seventh embodiment will be assigned the same reference numerals to avoid duplicating descriptions, and only different aspects will be described.

A counterweight mechanism 870 includes two support members 871 and 872, the counterweight holding member 673, and the counterweight 674. The support members 871 and 872 are located along the direction perpendicular to the directions of the reciprocation motion of the piston 43. The counterweight 674 is interposed between the support members 871 and 872. The support member 871 includes a first support member 875 and a second support member 877 being closer to the counterweight 674 than the first support member 875 to the counterweight 674. The support member 872 includes a pair of first support members 876 and a second support member 878 positioned closer to the counterweight 674 than the first support members 876 to the counterweight 674. In the ninth embodiment, the second support members 877 and 878 are positioned closer to the counterweight 674 than the second support members 677 and 678 in the seventh embodiment.

The pair of first support members 876 is made from rubber and supports the lower end of the counterweight holding member 673 from either side in the directions of the reciprocation motion of the piston 43. Since the first support members 876 are made from rubber, the lower end of the counterweight holding member 673 is elastically supported by the first support members 876 while being capable of moving up and down with respect to the first support members 876. Therefore, vibration of the counterweight 674 and the counterweight holding member 673 can be controlled by the strength at which the first support members 876 push against the counterweight holding member 673. Accordingly, characteristic vibration frequency and damping of the counterweight mechanism 870 can be adjusted arbitrarily. Accordingly, a vibration control mechanism (the counterweight mechanism 870) suited for various types of electrical power tools can be provided. Thus, in the counterweight mechanism 870 according to the ninth embodiment, the vibration of the impact tool 801 caused by the reciprocation motion of the striking member 44 can be reduced efficiently. Other advantages of the impact tool 801 are similar to the advantages of the impact tool 601 according to the seventh embodiment.

Figure 21:
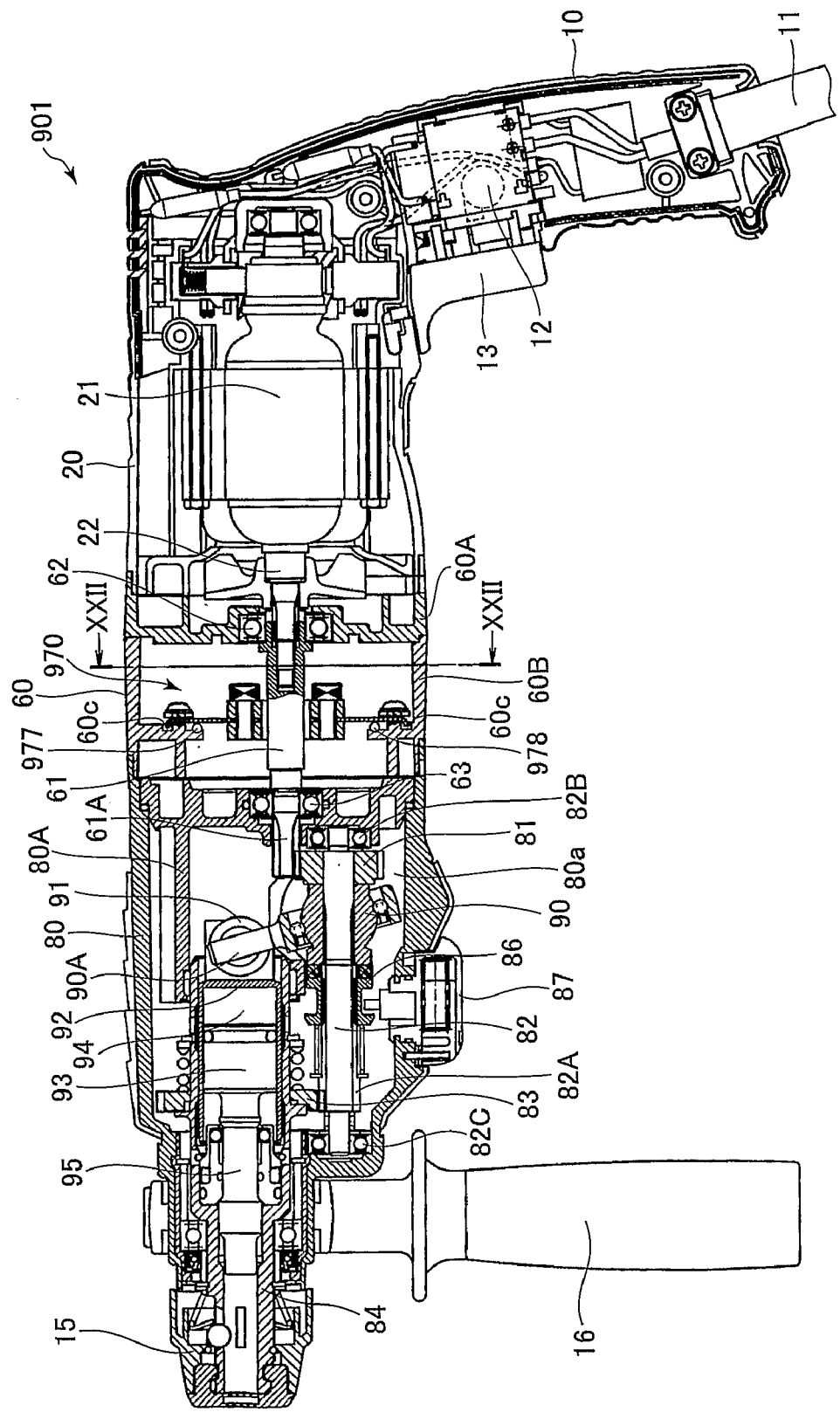
FIG. 21 is a cross-sectional view showing an impact tool according to a tenth embodiment of the present invention.
Figure 22:
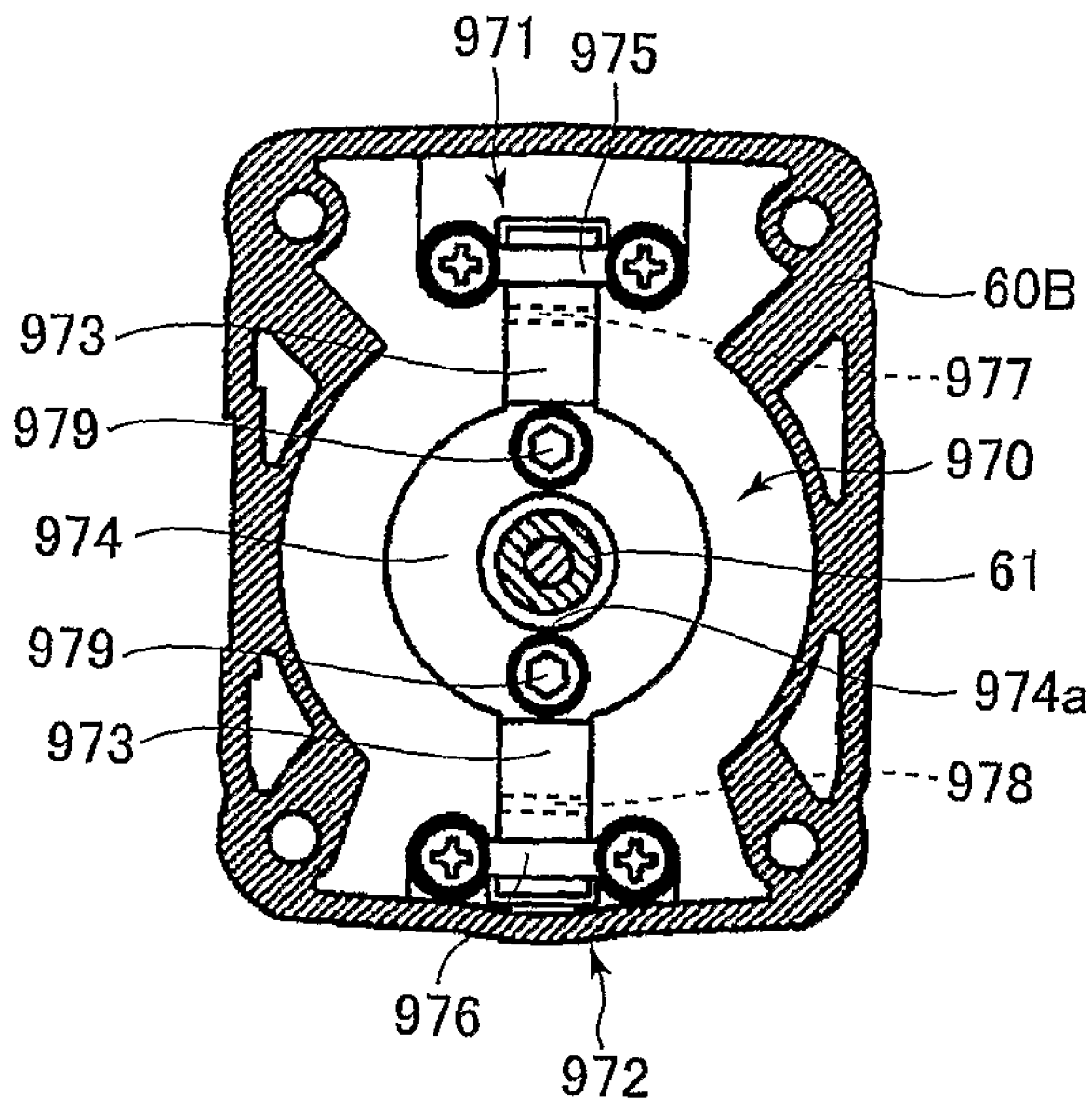
FIG. 22 is a cross-sectional view of the impact tool taken along a line XXII-XXII in FIG. 21.

Next, an electrical power tool according to a tenth embodiment of the present invention will be described while referring to FIGS. 21 and 22. The electrical power tool of the present invention is applied to an impact tool 901. Like parts and components that are the same as those of the sixth embodiment will be assigned the same reference numerals to avoid duplicating descriptions, and only different aspects will be described.

A counterweight mechanism 970 is provided in the weight housing 60. As shown in FIG. 22, which is a cross-sectional view taken along the XXII-XXII line in FIG. 21, the counterweight mechanism 970 includes two support members 971 and 972, a pair of counterweight holding members 973, a counterweight 974, and a bolt 975. The support members 971 and 972 are provided at the upper and lower end portions of the second weight housing 60B, respectively. The counterweight 974 is interposed between the support members 971 and 972. The support members 971 and 972 include first support members 975 and 976 and second support members 977 and 978 positioned closer to the counterweight 974 than the first support members 975 and 976 to the counterweight 974. The first support member 975 blocks the upper end portion of the counterweight holding members 973 from moving toward the rear side. The second support member 977 is positioned below the outer support 975 and on the front side of the counterweight holding members 973 and prevents the counterweight holding members 973 from moving toward the front side.

The first support member 976 is positioned at the lower end of the counterweight holding members 973 and blocks the counterweight holding members 973 from moving toward the rear side. The second support member 978 is positioned above the first support member 976 and on the front side of the counterweight holding members 973 and blocks the counterweight holding members 973 from moving toward the front side. The first support members 975 and 976 and the second support members 977 and 978 are positioned so that a rearward offset load F is applied to the counterweight holding members 973.

The pair of counterweight holding members 973 is made from leaf springs. As shown in FIG. 21, the upper and lower ends of the counterweight holding members 973 have roughly an L-shaped, and each of the distal ends of the upper and lower end portions of the counterweight holding members 973 is positioned in each of the recesses 60c formed in the second weight housing 60B, respectively. The counterweight 974 has a roughly circular cross-section and is formed with a shaft insertion hole 974*a* formed at the center thereof. The counterweight 974 is fixed to the counterweight holding members 973 by bolts 979. Hence, the counterweight 974 is doubly supported on its both ends by the pair of counterweight holding members 973. The first intermediate shaft 61 is inserted through the shaft insertion hole 974*a*. The distances from the first support members 975 and 976 to the positions where the counterweight 974 is fixed to the counterweight holding members 973 are the same, and the distance from the inner supports. 977 and 978 to the positions where the counterweight 974 is fixed to the counterweight holding members 973 are the same.

In the counterweight mechanism 970 of the impact tool 901 according to the tenth embodiment, characteristics similar to the load-displacement curve in FIG. 15 and the frequency response curve in FIG. 17A for the counterweight mechanism 670 of the seventh embodiment can be obtained. Accordingly, advantages of the counter weight mechanism 970 similar to those of the counterweight mechanism 670 according to the seventh embodiment can be obtained. Furthermore, since each of the upper and lower end portions of the counterweight holding member 973 has the L-shaped and is positioned in each of the recesses 60*c*, the counterweight holding member 973 can be prevented from slipping out from the first support members 975 and 976.

The impact tool of the present invention is not restricted to the embodiments described above, and various changes and improvements may be effected within the scope of the claims. For example, the pair of support members 72 of the impact tool 1 according to the first embodiment is made from steel roller, but the present invention is not limited to the steel roller. Any component having good sliding properties, e.g., an oil-impregnated metal, can be used. The first support members 676 and 876 in the impact tools 601 and 801 of the seventh embodiment and the ninth embodiment are made from rubber, but the present invention is not limited to the rubber. Any component having good sliding properties, e.g., a steel roller or an oil-impregnated metal, can be used. In the embodiments described above, the electrical power tool of the present invention is applied to the impact tool, but it would also be possible for the present invention to be applied to a saber saw.

The invention claimed is:

1. An electrical power tool comprising:
   a housing;
   an electrical motor accommodated in the housing;
   a motion conversion mechanism configured to convert a rotary motion of the electrical motor into a reciprocation motion;
   a counterweight holding member extending in a direction perpendicular to directions of the reciprocation motion and capable of being elastically deformed in the directions of the reciprocation motion;
   a counterweight supported by the counterweight holding member and capable of reciprocating in the directions of reciprocation motion together with the counterweight holding member; and
   support members positioned away from the counterweight by a predetermined distance for supporting the counterweight holding member to the housing, the counterweight being interposed between or among the support members.

2. The electrical power tool as claimed in claim 1, wherein the support members comprise two support members positioned opposing each other.

3. The electrical power tool as claimed in claim 1, wherein the counterweight holding member has end portions corresponding to the support members, at least one of the end portions being movably supported with respect to the support members.

4. The electrical power tool as claimed in claim 1, wherein the counterweight and the counterweight holding member are configured to vibrate to reduce a vibration generated by the reciprocation motion of the motion conversion mechanism, and
   wherein at least one of the support members is configured to restrict a vibration of the counterweight and the counterweight holding member.

5. The electrical power tool as claimed in claim 1, wherein the counterweight holding member has end portions corresponding to the support members, at least one of the end portions of the counterweight holding member having a slip prevention section for preventing the counterweight holding member from slipping out from the support members.

6. The electrical power tool as claimed in claim 1, wherein the support members, the counterweight holding member, and the counterweight are interposed between the motor and the motion conversion mechanism.

7. The electrical power tool as claimed in claim 1, wherein the counterweight comprises a base and two legs, the base extending in a direction perpendicular to the direction in which the counterweight holding member extends, the base being fixed to the counterweight holding member, and having ends, each of two legs being connected to each of the ends of the base respectively and extending along and being separated from the counterweight holding member.

8. The electrical power tool as claimed in claim 1, wherein the motion conversion mechanism comprises:
   a cylinder having an inner periphery;
   a piston slidably provided on the inner periphery of the cylinder;
   a motion conversion section configured to convert the rotation of the electrical motor into a reciprocation motion of the piston; and
   a striking member driven by the reciprocation motion of the piston.

9. The electrical power tool as claimed in claim 1, wherein the supporting member is configured to change a state that the supporting member supports the counterweight holding member when the counterweight moves from an initial position thereof toward at least one direction of the reciprocation motion.

10. The electrical power tool as claimed in claim 9, wherein each of the support members includes a first support member and a second support member, the first support member being configured to block the counterweight holding member from moving toward the one direction, the second support member being positioned closer to the counterweight than the first support member to the counterweight and being configured to block the counterweight holding member in another direction opposite to the one direction, the first support member and the second support member being positioned to apply an initial force in the one direction to the counterweight holding member.

11. The electrical power tool as claimed in claim 10, wherein the counterweight holding member includes a bent section, the counterweight holding member being supported by the first support member and the second support member at the bent section.

12. The electrical power tool as claimed in claim 10, wherein the counterweight holding member is movably supported with respect to the first support member.

13. The electrical power tool as claimed in claim 10, wherein the first support member is configured to restrict a vibration of the counterweight and the counterweight holding member.

14. The electrical power tool as claimed in claim 10, wherein one first support member of one support member movably supports the counterweight and another first support member of another support member is configured to restrict a vibration of the counterweight and the counterweight holding member.

15. The electrical power tool as claimed in claim 10, wherein the counterweight holding member has a slip prevention section for preventing the counterweight holding member from slipping out from the first support member.

16. The electrical power tool as claimed in claim 9, wherein the support members, the counterweight holding member, and the counterweight are interposed between the motor and the motion conversion mechanism.

17. The electrical power tool as claimed in claim 10, wherein the counterweight holding member has a part positioned between the first support members, the counterweight having a center of gravity positioned at a center of the part.

18. The electrical power tool as claimed in claim 9, wherein the counterweight comprises a base and two legs, the base extending in a direction perpendicular to the direction in which the counterweight holding member extends, the base being fixed to the counterweight holding member, and having ends, each of two legs being connected to each of the ends of the base respectively and extending along and being separated from the counterweight holding member.

19. The electrical power tool as claimed in claim 9, wherein the motion conversion mechanism comprises:
   a cylinder having an inner periphery;
   a piston slidably provided on the inner periphery of the cylinder;
   a motion conversion section configured to convert the rotation of the electrical motor into a reciprocation motion of the piston; and
   a striking member driven by the reciprocation motion of the piston.

* * * * *